US006188381B1

(12) United States Patent
van der Wal et al.

(10) Patent No.: US 6,188,381 B1
(45) Date of Patent: *Feb. 13, 2001

(54) MODULAR PARALLEL-PIPELINED VISION SYSTEM FOR REAL-TIME VIDEO PROCESSING

(75) Inventors: Gooitzen Siemen van der Wal, Hopewell; Michael Wade Hansen, Lawrenceville; Michael Raymond Piacentino, Princeton; Frederic William Brehm, Lawrenceville, all of NJ (US)

(73) Assignee: Sarnoff Corporation, Princeton, NJ (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/002,265

(22) Filed: Dec. 31, 1997

Related U.S. Application Data

(60) Provisional application No. 60/058,270, filed on Sep. 8, 1997.

(51) Int. Cl.[7] ............................. G06K 9/40; G06F 15/173
(52) U.S. Cl. .......................... 345/112; 345/518; 348/721
(58) Field of Search ........................... 348/721; 315/676; 345/118, 112, 18; 711/151; 712/11

(56) References Cited

U.S. PATENT DOCUMENTS

| Re. 34,282 | | 6/1993 | Suzuki et al. | 395/425 |
|---|---|---|---|---|
| 4,400,771 | * | 8/1983 | Suzuki et al. | 711/151 |
| 4,601,055 | * | 7/1986 | Kent | 382/495 |
| 4,703,514 | * | 10/1987 | Van Der Wal | 382/41 |
| 4,709,327 | * | 11/1987 | Hillis et al. | 711/150 |

(List continued on next page.)

OTHER PUBLICATIONS (Thurber, Kenneth; A Systematic Approach to theDesign of Digital Bussing Structures; Fall Joint Computer Conference; pp. 1–10), 1972.*
(Guttage, et al; A Single–Chip Multiprocessor for Multimedia: The MVP; IEEE Computer Graphics & Applications, vol. 12, ISS.6), Nov. 1992.*
"Sensar VFE–100" brochure by the Pyramid Vision Company, 1994.
"PVT–200" brochure byPyramid Vision Technologies, Jun. 1997.

* cited by examiner

Primary Examiner—Andrew I. Faile
Assistant Examiner—Reuben M. Brown
(74) Attorney, Agent, or Firm—William J. Burke

(57) ABSTRACT

A real-time modular video processing system (VPS) which can be scaled smoothly from relatively small systems with modest amounts of hardware to very large, very powerful systems with significantly more hardware. The modular video processing system includes a processing module containing at least one general purpose microprocessor which controls hardware and software operation of the video processing system using control data and which also facilitates communications with external devices. One or more video processing modules are also provided, each containing parallel pipelined video hardware which is programmable by the control data to provide different video processing operations on an input stream of video data. Each video processing module also contains one or more connections for accepting one or more daughterboards which each perform a particular image processing task. A global video bus routes video data between the processing module and each video processing module and between respective processing modules, while a global control bus provides the control data to/from the processing module from/to the video processing modules separate from the video data on the global video bus. A hardware control library loaded on the processing module provides an application programming interface including high level C-callable functions which allow programming of the video hardware as components are added and subtracted from the video processing system for different applications.

30 Claims, 6 Drawing Sheets

U.S. PATENT DOCUMENTS

| | | | |
|---|---|---|---|
| 4,797,942 | * | 1/1989 | Burt .......................................... 382/41 |
| 4,942,470 | * | 7/1990 | Nishitani et al. ..................... 358/160 |
| 4,959,717 | * | 9/1990 | Faroudja ............................... 358/147 |
| 4,985,848 | | 1/1991 | Pfeiffer et al. ......................... 364/518 |
| 5,046,023 | * | 9/1991 | Katsura et al. ........................ 364/518 |
| 5,051,835 | * | 9/1991 | Bruehl et al. .......................... 358/311 |
| 5,129,092 | * | 7/1992 | Wilson .................................. 395/800 |
| 5,241,389 | * | 8/1993 | Bilbrey .................................. 348/552 |
| 5,291,368 | | 3/1994 | Conroy-Wass ....................... 361/796 |
| 5,339,221 | * | 8/1994 | Wass ..................................... 361/796 |
| 5,339,443 | * | 8/1994 | Lockwood ............................... 710/38 |
| 5,359,674 | * | 10/1994 | Van Der Wal ......................... 382/41 |
| 5,402,488 | * | 3/1995 | Karlock ................................. 348/476 |
| 5,435,737 | | 7/1995 | Haga et al. ............................. 439/157 |
| 5,455,920 | * | 10/1995 | Muramatsu ........................... 711/148 |
| 5,461,679 | | 10/1995 | Normile et al. ....................... 382/304 |
| 5,502,512 | * | 3/1996 | Toyoda et al. ........................ 348/706 |
| 5,544,292 | * | 8/1996 | Winser .................................. 395/130 |
| 5,550,825 | * | 8/1996 | McMullan et al. ..................... 370/73 |
| 5,606,347 | * | 2/1997 | Simpson ............................... 348/187 |
| 5,610,653 | | 3/1997 | Abecassis ............................. 348/110 |
| 5,613,146 | | 3/1997 | Gove et al. ........................... 395/800 |
| 5,652,904 | * | 7/1997 | Trimberger ............................ 712/38 |
| 5,664,214 | * | 9/1997 | Taylor et al. ....................... 395/800.2 |
| 5,701,507 | | 12/1997 | Bonneau, Jr. et al. ............... 395/800 |
| 5,732,164 | * | 3/1998 | Kawaguchi et al. .................. 348/721 |
| 5,734,808 | * | 3/1998 | Takeda ................................. 345/326 |
| 5,761,466 | * | 6/1998 | Chau ..................................... 348/721 |
| 5,768,609 | * | 6/1998 | Gove et al. ...................... 395/800.11 |
| 5,790,642 | * | 8/1998 | Charles et al. ....................... 395/559 |
| 5,809,174 | * | 9/1998 | Purcell et al. ........................ 382/236 |
| 5,835,147 | * | 11/1998 | Florentin et al. ..................... 348/416 |
| 5,910,117 | * | 6/1999 | Basoglu et al. ....................... 600/454 |
| 5,915,088 | * | 6/1999 | Basavaiah et al. ............. 395/200.28 |
| 5,923,339 | * | 7/1999 | Date et al. ............................ 345/505 |
| 5,963,675 | * | 3/2000 | Van Der Wal et al. ............. 382/260 |
| 6,044,166 | * | 3/2000 | Bassman et al. ..................... 382/103 |

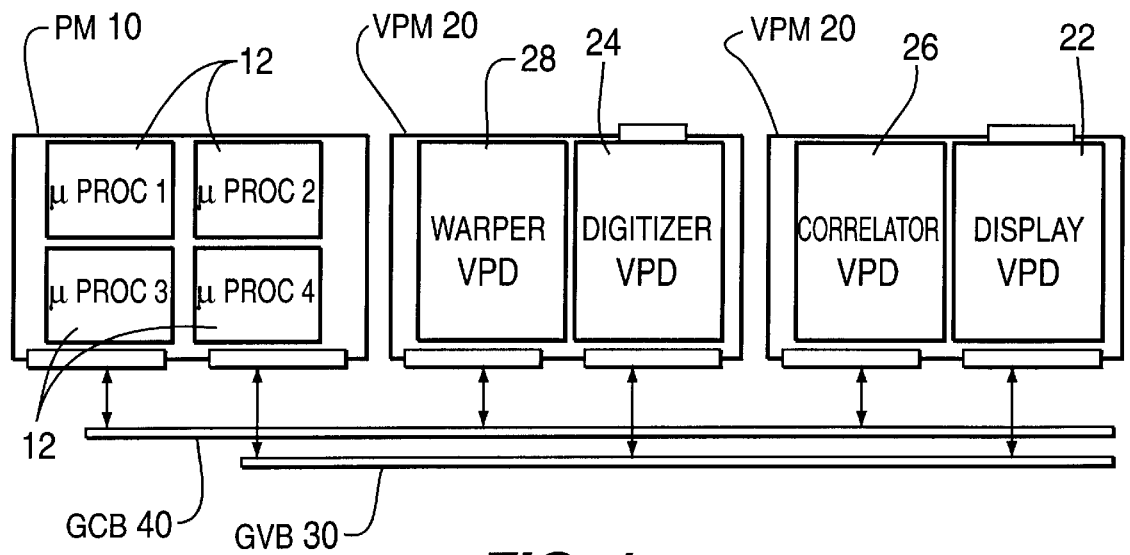
FIG. 1
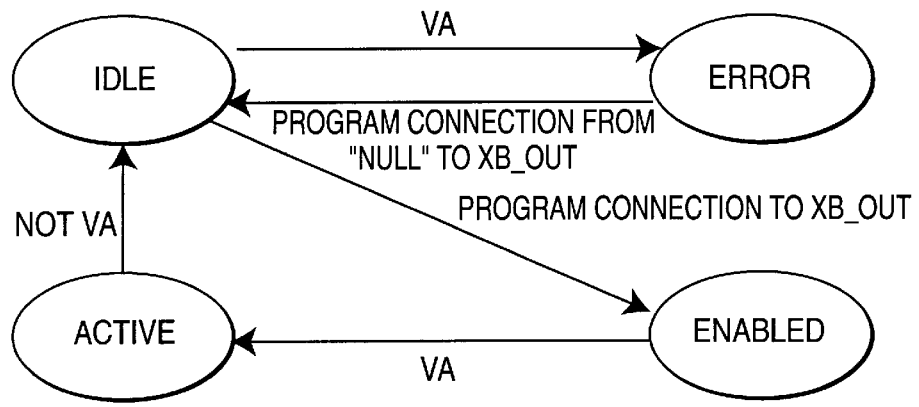
FIG. 2A STATE DIAGRAM FOR CROSSBAR OUTPUT PORTS XB_OUT
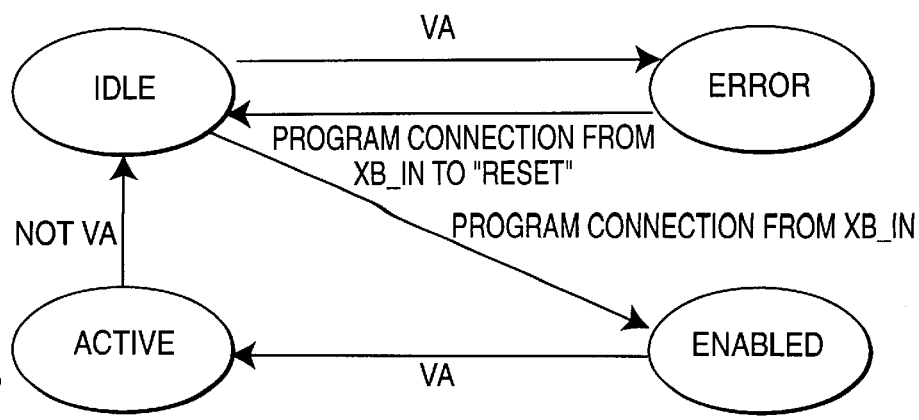
FIG. 2B STATE DIAGRAM FOR CROSSBAR INPUT PORTS XB_IN

MODULAR PARALLEL-PIPELINED VISION SYSTEM FOR REAL-TIME VIDEO PROCESSING

CROSS-REFERENCE TO RELATED APPLICATIONS

The present application claims priority from U.S. Provisional Patent Application Ser. No. 60/058,270 filed Sep. 8, 1997.

STATEMENT OF GOVERNMENTAL INTEREST

This invention was made under Government Contract No. DAAK70-93-C-0066. The Government has certain rights in the invention.

BACKGROUND OF THE INVENTION

1. Field of the Invention

The present invention relates to a parallel-pipelined vision system for real-time video processing and a corresponding method for processing video signals, and more particularly, to such a system which has been designed to be modular and readily scalable for different applications.

2. Description of the Prior Art

Real-time video processing applications are continuing to grow as the capabilities of video processing systems increase. Typical examples of applications of video processing include autonomous vehicle navigation, vehicle anti-collision systems, video surveillance (both manned and unmanned), automatic target recognition, industrial inspection, and electronic video stabilization and mosaic construction. The common requirement for all of these applications is a need to be able to process the video imagery at rates suitable for processing live video. Vehicular obstacle avoidance, for example, requires very fast feedback of obstacle positions to the vehicle navigation system so that the vehicle can be guided around the impending obstacle. Other applications, such as video surveillance and electronic video stabilization, require output that is provided at full video rates for viewing by an operator.

The amount of data to be processed for real-time imaging can easily get into the billions of operations per second. Standard video provides approximately 30 Mbytes/sec of video information that needs to be processed. Thus, even just 50 operations per pixel, which is a modest amount of processing on a per-pixel basis, results in over 1.5 billion operations per second to be performed to process a standard video stream. Standard personal computers and workstations are incapable of providing video processing at such real-time rates. The processing capabilities of these systems are typically an order of magnitude or more lower than required, and the internal bussing of the standard workstation is incapable of providing the data throughput required for both receiving a digital video signal and providing a full-resolution video display output. As a result, dedicated pipelined video processing systems have been designed by a number of different manufacturers to provide real-time performance.

For example, the Max Video 250 system, developed and distributed by Datacube, is one example of a system capable of processing multiple video channels, each of which can process pixels at 20 Mpixels/sec video rates. However, the MV250 only contains a single filtering element, while many are often required for real-time multi-resolution image processing. The MV250 also provides limited capability of operating on multi-resolution images, because it has only five timing channels, while there are 32 input and output paths to the video crossbar switch. In addition, a significant amount of control overhead is required to calculate the appropriate delays for each processing path. Moreover, there are only a limited amount of video paths available between the video processing motherboards, and the five timing channels available on one board are shared among all processing boards. As a result, scaling up of the multi-resolution processing becomes very cumbersome, and use of the available resources is inefficient.

The MV250 also relies on using standard general purpose processor boards for system control and, therefore, does not provide a means to transfer processed video data efficiently to the general purpose processor for higher level video data processing. Datacube has provided specific solutions to add general purpose processing capability to the system with fast video data stream transfer by providing special purpose DSP boards with such a video interface (e.g., an 1960 based processing board); however, in that case, the control of the video hardware and the high level processing of video data is decoupled, significantly reducing the efficiency of algorithm implementations and adding additional control software and control time to synchronize the tasks.

The Imaging Technologies 150/40 is another example of a parallel-pipelined system, which is capable of processing 40 Mpixels/sec, also through multiple channels simultaneously. This system has similar limitations as the MV250 except that the distribution of video data paths within the video processing boards and among the video processing boards is even more limited.

Effective real-time video processing by such dedicated pipelined video processing systems requires the efficient execution of a number of operations referred to as "front-end" operations. Real-time video processing relies heavily on the operation of these front-end operations to perform higher-level operations at the desired rates. One of the principal front-end operations is the generation of multiresolution image representations. These representations, referred to commonly as image pyramids, involve decomposing an original image at its full resolution into successive representations at lower spatial resolutions. This is performed through iteratively filtering the image and subsampling the filtered results. The most common of the pyramids, called the Gaussian pyramid, involves successively low-pass filtering and decimating the original image, providing a sequence of smaller and smaller images that represent image features at lower and lower spatial resolutions. A pyramid processor integrated circuit which provides such pyramid filtering has been described, for example, by one of the present inventors in U.S. Pat. No. 5,359,674 and U.S. patent application Ser. No. 08/838,096.

An efficient real-time video processing system must be able to perform front-end operations at real-time video rates and to provide the results of the front-end processing to general-purpose processors, which analyze the results and make decisions based on the results. However, the higher-level operations subsequent to the front-end processes are typically very much application specific and significantly more complex. This makes the higher-level operations less suitable for optimization in hardware. The front-end processes, on the other hand, are ubiquitous and should be efficiently implementable in hardware.

Based on these considerations, the following list of features can be used to define an effective real-time video processing system:

Fast convolution and pyramid generation. This includes the generation of Gaussian and Laplacian pyramids, as well as gradient filters and other generally-applicable filtering operations.

Reconfigurable arithmetic logic units. Image pointwise addition, subtraction, multiplication, and other more arbitrary operations are very common with front-end processes.

Look-up table operations. These operations involve single-image transformations that are performed pointwise on the image. Adding gain to an image, inverting an image, scaling an image, thresholding an image, and other such functions are typical of look-up table transformations.

Efficient parallel architecture. This describes the ability to use multiple components in parallel in an efficient way. Processing resources are not useful if they cannot flexibly be used while other processing resources are busy.

Fast transferal of video data to general-purpose processors. When image data must be analyzed by a DSP or general-purpose microprocessor, the image data must be quickly accessible.

High-level hardware control. A reentrable, multitasking environment must be available for hardware control to achieve maximum efficiency and programmability.

A real-time video processing system developed by the present assignee and known as the Sensar VFE-100 has been developed in view of these considerations. The VFE-100 provides real-time image stabilization, motion tracking, change detection, stereo vision, fast search for objects of interest in a scene, robotic guidance, and the like by focusing on the critical elements in each scene using the pyramid filtering technique to perform initial processing at reduced resolution and sample density and then progressively refining the processing at higher resolutions as needed.

Video image processing by the VFE-100 occurs in three stages: signal transformation, signal selection, and attribute estimation. Two basic signal transformations are supported. First, an image warp brings pairs of images into a common coordinate system (motion, stereo or observed and reference images) so that subsequent processes can be uniform and local. Second, the pyramid transform decomposes the image signals into band-pass components in the spatial domain. Signal selection is performed in the pyramid transform domain. The location and resolution of data used in subsequent analysis is controlled by selecting those data from an appropriate window at an appropriate level of the pyramid. Selected data are then processed to obtain estimates of the attributes of interest. These include displacement vectors in the case of motion or stereo, or texture or feature energy for altering and orienting. The transformed data are formatted to suit analysis through the application of compact filters which can describe measures such as local correlation, variance, texture energy, and local moments.

The VFE-100 is designed as a general purpose computing engine for real-time vision applications. Pipeline processing is performed as image data flow through a sequence of elements, and data flow paths and processing elements can be reconfigured to serve a wide variety of tasks. Once configured, a sequence of steps can be performed for an entire image or a sequence of images without external control. It is now desired to improve upon the VFE-100 by designing such a real-time video processing system such that it is modular and can be scaled smoothly from a relatively small system with modest amounts of hardware to a very large, very powerful system with significantly more hardware. In particular, it is desired to design a modular real-time video processing system which may be custom tailored to specific applications through the addition of new processing components, and the reconfiguration of available devices. The present invention has been designed to meet these needs in the art.

SUMMARY OF THE INVENTION

The above-mentioned needs in the art have been met in accordance with the invention by providing a modular video processing system (VPS) which allows the VPS to be scaled smoothly from a relatively small system with modest amounts of hardware to a very large, very powerful system with significantly more hardware. The modularity of the design of the VPS of the invention enables the VPS to be custom tailored to specific applications through the addition of new processing components, and the reconfiguration of available devices.

In particular, the present invention is a real-time video processing system and a method for processing video signals. In accordance with a preferred embodiment of the invention, the VPS is broken up into a modular multi-processor processing module (PM) with up to two additional daughterboards containing a microprocessor (preferably a digital signal processor (DSP)) and a hardware control library (HCL), one or more modular pipelined video processing modules (VPM) with application specific daughterboards, and a global control bus (GCB) and a global video bus (GVB) connecting the PM and VPMs.

The VPS of the invention combines a number of elements in a modular configuration including one or more VPMs which provide basic processing functions that operate efficiently on multiple video data streams and which can store and retrieve multiple video data streams. For "Front-End" video processing, multiples of the basic video processing elements are required, such as frame stores, 2D filter functions, look-up table (LUT) operations, and one and two input arithmetic operations.

Since the video processing elements and the video data streams efficiently handle video data of variable image resolution in parallel, and without difficulty, each video data stream may be of a different image resolution. In a preferred embodiment, this is implemented by providing independent timing information along with each video stream using the techniques described in the afore-mentioned U.S. Pat. No. 5,359,674 and U.S. patent application Ser. No. 08/838,096. This has the additional benefit of significantly reducing the control overhead, because the pipeline delay does not have to be calculated for each processing operation, and many functions can automatically adapt their parameters based on the timing information.

The VPS of the invention preferably contains a variety of smaller, more specific video processing modules or Video Processing Daughterboards (VPD) that are designed to perform more application specific functions. Typically the VPDs are implemented so that multiple VPDs can be mechanically attached to each VPM. The VPDs can range from very specific video processing functions, such as a video digitizer, or video display, to a range of dedicated video processing functions such as image correlations and image warping, or special image storage functions, or can include general processors such as one or more DSPs.

The VPS of the invention also contains at least one general purpose processing module (PM) with up to four processors, which has the task of controlling all the functions in the VPS, providing control and/or data interface to the external world, and providing general purpose processing to data that was first processed by the video processing functions of the VPS. The VPS preferably provides a way to scale the number of general purpose processors for efficient multi-processor applications as well as a technique for efficient multi-processor multi-tasking and multi-threading.

The global video bus is an efficient and high bandwidth video stream data bus that can scale in bandwidth when multiple VPMs are added into the system, while the global control bus is an efficient control bus between the PM and the rest of the VPS.

The global control bus passes control data from a hardware control library of the PM to the VPMs which allows for on-the-fly programming of field programmable gate arrays used to perform many of the processing functions of the VPMs. Transmission of the control data over the global control bus separately from the video data transmitted over the global video bus is important, for if the setting up the processing of the video operations is not efficient, the real-time performance of the system degrades significantly.

BRIEF DESCRIPTION OF THE DRAWINGS

The present invention will be better understood after reading the following detailed description of the presently preferred embodiments thereof with reference to the appended drawings, in which:

FIG. 1 is a block diagram of the modular video processing system of the invention.

FIGS. 2A and 2B illustrate the state diagrams of the crosspoint state machine of the crosspoint switch for the output ports (XB_OUT) (FIG. 2A) and input ports (XB_IN) (FIG. 2B).

DETAILED DESCRIPTION OF THE PREFERRED EMBODIMENT

Figure 2:
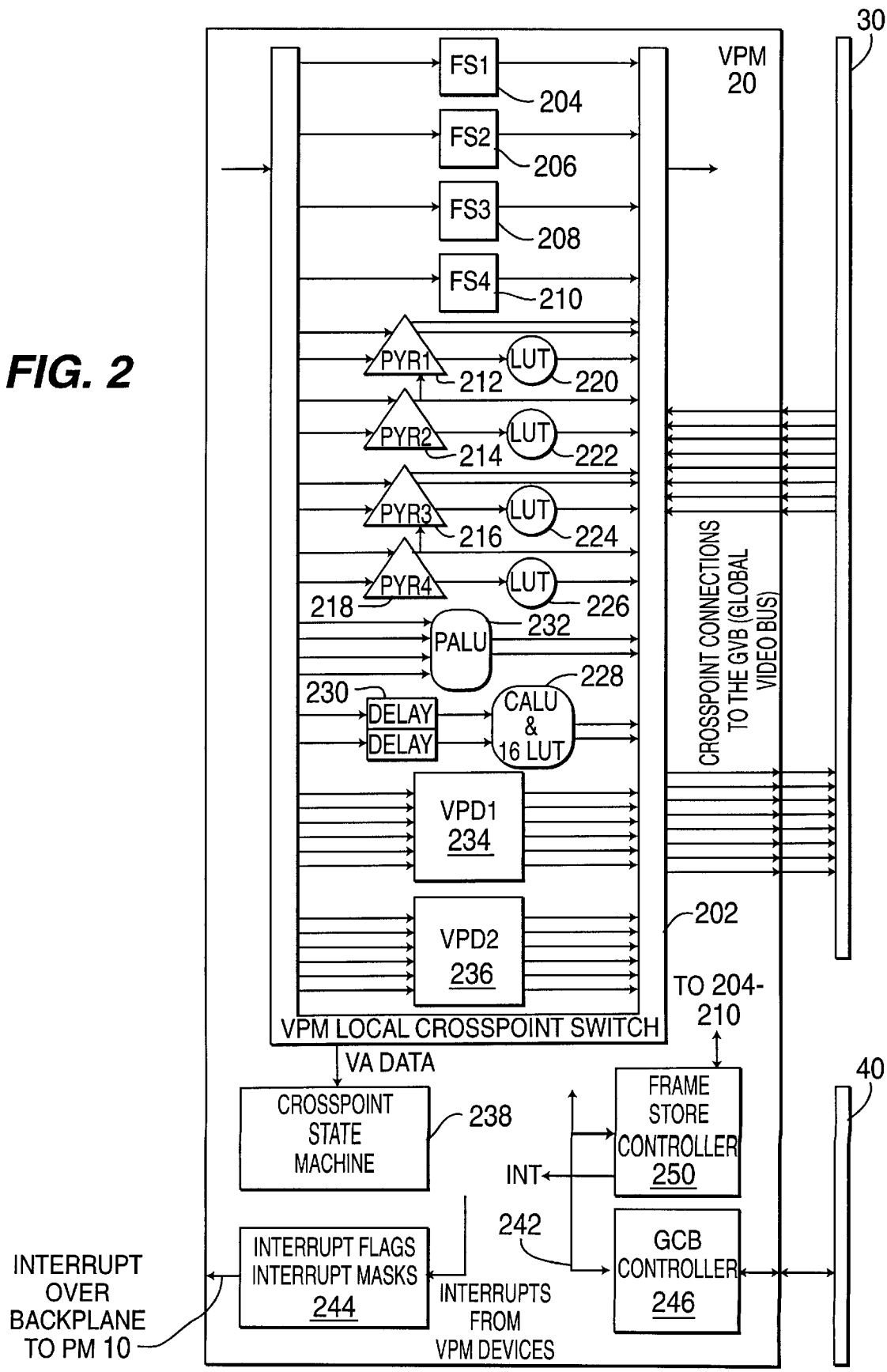
FIG. 2 is a top-level block diagram of the Video Processor Motherboard (VPM).

A system and method which meets the above-mentioned objects and provides other beneficial features in accordance with the presently preferred exemplary embodiment of the invention will be described below with reference to FIGS. 1–8. Those skilled in the art will readily appreciate that the description given herein with respect to those figures is for explanatory purposes only and is not intended in any way to limit the scope of the invention. Accordingly, all questions regarding the scope of the invention should be resolved by referring to the appended claims.

System Overview

As illustrated in FIG. 1, the real-time video processing system (VPS) of the invention is divided into four major system components, with numerous subcomponents. The major components the VPS are:

A Processor Motherboard (PM) 10 which provides general-purpose microprocessors or digital signal processors (DSPs) 12 for controlling the dedicated video hardware, performing image analysis operations that are not easily mapped into the video hardware, and facilitating communications with other components that are not an integral part of the VPS system.

A Video Processor Motherboard (VPM) 20 which is the baseline video processing component within the VPS. Each VPM 20 contains dedicated, parallel-pipelined video hardware that is capable of performing operations on streams of video at a consistent rate (based on a global pixel clock). As shown in FIG. 1, the VPM 20 also supports the addition of one or two daughterboards, called Video Processing Daughterboards (VPDs) 22–28 for specialized image acquisition, display, and processing devices. As illustrated, there can be one or more VPMs 20 within a single VPS system, each with its own set of VPDs. Of course, the VPDs are not limited to those shown and described herein but may be other processing boards connected in different configurations.

A Global Video Bus (GVB) 30 which defines a dedicated, proprietary video backplane that enables video information to be transferred between the VPMs 20 of the VPS at 33 MBytes per second, and also for video to be transferred to and from the microprocessors 12 on the PM 10.

A Global Control Bus (GCB) 40 provides control bussing between the PM 10, the VPMs 20, and the GVB 30 of the VPS. Control register accesses from the PM 10 are transacted over GCB 40 to the destination boards within the VPS. Typically, no video transactions are performed over this GCB 40.

The basic operational and architectural aspects of the three major VPS subsystems will now be described. The next section will provide more detailed information on each component of the VPS system in turn. It should be noted that the term "reconfigurable" has been given two meanings herein, namely: "reconfigurable" devices having control registers which may be programmed to a new structure and "reconfigurable" devices such as FPGAs which are reconstituted to perform a different hardware function.

PM 10 functions as the microprocessor core of the VPS. Two microprocessors 12 are actually used in PM 10 with a possibility of adding one or two more microprocessors 12 as daughterboard components. The primary function of the PM 10 is to provide the command and control of video processing operations that are performed by the VPMs 20 and their associated VPDs 22–28. Video processing operations within the VPS require the initial setup of control registers in the video hardware, followed by the assertion of an enable signal that defines the beginning of execution for that operation. The PM's microprocessors 12 perform the register programming and video processing operation execution through accessing memory-mapped VPM/VPD control registers. A high-level, C-callable hardware control library loaded on one or more of the microprocessors 12 is used to facilitate the coordination of the video hardware. A second function of PM 10 is to provide additional processing for imagery that cannot be performed more efficiently using the available dedicated hardware. The GVB 30 provides high-speed data paths enabling each of the VPMs 20 to provide video information to each microprocessor's local memory. Image operations can then be performed by the microprocessors 12 on the imagery as required by the final application. The third function of PM 10 is communications. While the VPS is usually configured with video inputs and outputs, there is also a need for lower-speed, more general data communications. Such communications can include RS-232 serial data communications and Ethernet.

VPM 20 is a dedicated video processing board. All video hardware in the VPS operates on video streams in a parallel-pipelined fashion. This means that video data is read out of frame stores a pixel at a time, with appropriate timing signals framing the active video information. As this video flows through the system, it is processed by the various processing units on VPM 20, or the video can be stored in destination memories. All processing components on VPM 20 are designed to work within this flow-through architecture for data processing. Each processing unit will add a fixed amount of pipeline delay in the processing, but will be guaranteed to maintain the data throughput of the system. Thus, the amount of time required to perform an operation on a video frame is always deterministic, given a fixed amount of pipeline delay which depends on the operations being performed. The video routing through the system is performed through the use of a digital crosspoint switch of each VPM 20. This switch enables video from a source location to be routed to any destination on VPM 20, with no restrictions. Also, the crosspoint switch enables video to be "fanned out" from one source to multiple destinations with no penalties. All hardware operations, including crosspoint switch routing, are defined through the programming of memory-mapped control registers on VPM 20. Each processing device, crosspoint connection, and storage device has a set of registers that are manipulated to define specific operations. The PM's microprocessors 12 are responsible for setting up these control registers and enabling video operations to begin.

The VPDs 22–28 behave similarly to the devices on VPM 20. Each VPD has dedicated crosspoint switch inputs and outputs, and is also controlled through memory-mapped control registers.

As will be described in more detail below, some of the crosspoint inputs and outputs present within VPM 20 are dedicated to video routing to and from the VPM 20 to other VPS boards. GVB 30 is responsible for routing video between the VPS system boards.

Video can be routed between pairs of VPMs 20, and between the VPMs 20 and the PM 10. There are a number of different possible GVBs 30 depending on the application. The simplest GVB 30 provides dedicated, hard routed data channels between the VPS system boards with a fixed topology. This is the simplest and most cost-effective method for routing video between boards, but it is also the least flexible method. Other, more advanced versions of the GVB 30 include active routing capabilities. These routing capabilities are provided by a secondary crosspoint switch, which is present directly on the VPS active backplane. This crosspoint switch enables the same capabilities as the crosspoint switch on the VPM 20, namely, that any data output from a VPS system board can be routed to one or more destination VPS boards with no penalties. The only restrictions on the video routing with the GVB 30 are the number of inputs and outputs available on each VPS board.

The GCB 40 is responsible for performing the data accesses between the PM 10 and the other VPS system boards. Control register accesses by the PM's microprocessors 12 are always performed using GCB 40. GCB 40 is kept separate from the video bussing for the VPS to minimize the amount of traffic (bandwidth and latencies) that are present. GCB 40 can, in theory, be any standard address and data bus that is used by most types of microprocessors. The requirements on GCB 40 are that the bus speeds are very high (on the order of 250 nsec (8 clocks) or less per typical random data transaction). This speed precludes using many standard busses, such as VME. A CompactPCI™ bus is used in a preferred embodiment of the invention. This bus is a 33 MHZ, full 32-bit data bus that provides the appropriate control register programming speeds required by the VPS.

Preferred Embodiment

Since the primary purpose of the VPS of FIG. 1 is to perform video processing, the VPM 20 will be described first, then the PM 10 and its hardware control library (HCL), VPDs 22–28, GVB 30, and, finally, GCB 40.

Video Processor Module

A block diagram of the VPM 20 and its interconnections with the GVB 30 are shown in FIG. 2. The VPM 20 provides the basic video processing functions for the VPS. As noted above, multiple VPMs 20 can reside in the VPS, and each VPM 20 can contain up to two video processing daughterboards (VPDs) for specialized functions. In a preferred embodiment of VPM 20 illustrated in FIG. 2, each VPM 20 consists of the following key components:

A 39×39 channel non-blocking crosspoint switch 202, 10 bits per channel, representing 8 bits of video data and 2 bits of timing information for each pixel of video data transferred over the crosspoint switch bus.

Four 1K×2K pixel frame stores FS1–FS4 (204–210). These frame stores 204–210 are triple-ported, allowing full rate video reads and video stores simultaneously. A third random-access port is also provided for microprocessor direct access of the frame store's video RAM (VRAM).

Four pyramid generation modules 212–218. These pyramid modules 212–218 are implemented using a PYR-2 filtering ASIC of the type described in the aforementioned U.S. Pat. No. 5,359,674 and U.S. patent application Ser. No. 08/838,096 with associated 8-bit look-up tables (LUTs) 220–226 for pointwise image transformations. Each pair of ASICs is configured so that they can be combined to perform pyramid operations on 16-bit data.

One configurable ALU (CALU) 228. CALU 228 provides a method for performing pointwise operations on a pair of images. CALU 228 includes a timing compensator and a programmable image delay 230 at its input for automatic timing alignment, followed by a 16 bit input to 16 bit output (16:16) lookup table (LUT) and 32-bit accumulator.

One programmable ALU (PALU) 232. PALU 232 is used for multi-image operations. PALU 232 is comprised of a reconfigurable field programmable gate array (FPGA) with up to 16 Mbytes of DRAM. It supports four video inputs and two video outputs. A more detailed description of PALU 232 is provided in U.S. Provisional Patent Application Ser. No. 60/058,269 filed Sep. 8, 1997, also assigned to the present assignee.

Two VPD sites 234 and 236 are used for installing daughterboard components to specialize the VPS for different applications. Four different VPDs will be described in more detail below.

Preferably, VPM 20, GVB 30, and all VPD components are synchronous to a single system-wide clock. This clock operates at the highest possible speed that is achievable given the existing processing units within the VPS. In a preferred embodiment, the clock speed of the VPS is 33 MHZ. Of course, this clock can be increased in speed if semiconductor technology improves and the slowest components on the VPS are commensurately increased in speed.

The VPM 20 uses a standardized video format for video transfers between VPMs 20, video storage modules, the GVB 30, and the PM 10. This video format is comprised of 8 bits of data per pixel, plus two timing signals that frame the active video data by indicating areas of horizontal (HA) and vertical (VA) active data. There is a fixed blanking interval between each active line in the image. This blanking period is defined with HA deasserted (low) and VA asserted (high). There also may be blanking periods at the beginning and the end of each image. All video data is synchronous with the VPS system clock. Therefore, video data is transferred through the system at a 33 Mbyte/sec rate, or equivalently, a 33 Mpixel/sec rate. These rates do not include the blanking time that is present within the image. All processing, routing, and storage components in the VPS are designed to accept video in this format, and to provide video output in the same format.

In accordance with the invention, the video data is framed with HA and VA timing for several reasons, including:

1) Compensation of pipeline delays. All VPS processing devices, and most routing devices, incur pipeline delays in the video signal. Through the use of the HA and VA timing signals, the amount of pipeline delay each video image is subjected to is not important for programming, since the timing of the video signals is known through the timing information.

2) The timing information also enables automatic pipeline delay synchronization through analysis of the HA and VA signals. For example, when combining two or more images in hardware, the video data stream with the least delay must be delayed to have the same timing as the other video data stream(s) with which it is being combined. This timing synchronization can be performed automatically without knowing the pipeline delays a priori, which vastly simplifies many hardware control operations for the programmer of the system.

3) Knowledge of image size. The HA and VA timing signals enable the video devices to know the true size of the image without a priori information. As an example, frame stores can appropriately store images of the correct image size without a priori knowledge of the image size. This also simplifies many other aspects of the video processing, such as the input line delays and border control of the pyramid processing ASICs 212–218.

4) Independence of video routing channels. In the absence of HA and VA timing, the VPS would have to know both the image size and the pipeline delays a priori. This requires an exorbitant amount of analysis of the video operation, and causes complications in the hardware control of the video devices. If timing channels are provided for some video paths within the system and shared with other video paths, then there are limitations on the number of independent data paths that can flow through the VPS.

In short, through framing each video path with a separate HA and VA signal, it is possible to route independent video information with independent timings through all devices of the VPS simultaneously. Thus, the VPS of the invention provides totally parallel, non-blocking routing and processing.

The parallel-pipelined hardware within the VPS uses video framing signals with the data to delineate areas of active imagery and blanking for the video data. This information is, as mentioned above, instrumental in simplifying video devices within the VPS and making those devices easily programmable through software control. Another critical aspect of the VPS is providing synchronous starts for video processing operations. It is imperative that the video timing for multiple video paths be started in a synchronous fashion to ensure that the video timing begins with a known initial condition. Without this guarantee, the video hardware must always perform timing compensation when performing operations on multiple streams, since the initial differences in timing from multiple channels (also known as the timing skew between the channels) will be unknown. A common control signal, called RD_START, is provided within the VPS to provide synchronous starts for video read operations from source video devices. When RD_START is asserted (through a write to a register under microprocessor control), all previously enabled video source devices will begin reading out in a synchronous fashion. This provides the programmer with a known initial condition for video timing that is necessary for simplifying video timing analysis for subsequent processing. In a preferred embodiment, the RD_START signal is generated on a designated "master" VPM 20 (in a system with more than one VPM 20) and received synchronously by all VPMs 20, including the VPM "master," and all VPDs in the VPS. The use of a "master" VPM 20 does not limit the VPS from having multiple "masters" with more than one independent RD_START. Each RD_START may be controlled from a different source through a selected RD_START multiplexer. Multiple RD_STARTs allow for asynchronous independent video operations to be performed.

Preferably, VPM crosspoint switch 202 provides video, which is present at the outputs of video devices, to the inputs of other video devices for further processing or storage. As noted above, the VPM crosspoint switch 202 is preferably implemented as a 39×39 crosspoint switch, with 10 bits of data for each channel. These 10 bits represent the 8 bits of data and 2 bits of HA and VA timing in the format described above. In a preferred embodiment, the crosspoint switch 202 is implemented using 10 I-CUBE IQ96 crosspoint switch devices. Each of these devices provides a reconfigurable crosspoint switch for a single bit of the 10 bits of video data. These devices are configured so one control register write is capable of switching all 10 bits of data in all 10 IQ96 devices simultaneously.

Associated with each input and output data path in the crosspoint switch 202 is a crosspoint state machine 238 that monitors the video transfers over that path. In response to the video active (VA) data of all video input and output signals of the crosspoint switch 202, crosspoint state machine 238 provides status information about the video that is being transferred over a path. Using the crosspoint state machine 238, it is possible to determine whether or not a crosspoint switch data path is currently being used, or if it is idle. The four states for the crosspoint state machine 238 for the output ports (XB_OUT) and input ports (XB_IN) are illustrated in FIGS. 2A and 2B and are described as follows:

IDLE. This means that there is currently no data flowing through the data path, and the data path has not been enabled for routing data. If VA is detected while the crosspoint switch 202 is in the IDLE state, the state will transition to the ERROR state.

ENABLED. The state machine 238 transitions from the IDLE to the ENABLED state when the data path is programmed to perform a routing operation. When VA is detected while in this state, the state transitions to the BUSY state.

BUSY indicates that there is currently active video flowing through this data path after the data path was intentionally routed. When the falling edge of VA is detected, the state machine 238 will transition back to the IDLE state.

ERROR. The ERROR state indicates that VA was detected within a data path although the programmer did not intentionally route video through that path. This state can be cleared only through explicitly clearing the state machine 238 by connecting the crosspoint path to a predefined input (or output) path.

The crosspoint state machine 238 is crucial for two important reasons. First, the GVB 30 relies on the knowledge of which crosspoint channels are currently being utilized and which are available. This enables very simple, very fast allocation of video paths to and from each VPM 20 without keeping global state information internally to a hardware control library of the processors 12. Second, it is difficult for the hardware control library of the processors 12 to automatically turn off crosspoint outputs after a video operation has been completed. Turning off output paths after they are used requires additional bookkeeping and increases the number of control registers that are written to during each video operation. When crosspoint outputs are not turned off, unwanted video from unrelated video transfers can be provided to outputs that are currently unused. Specifically, this happens when a source device is used for an operation, then used for a subsequent operation with a different destination device. The first destination device will still be connected to the output of the source, and will inadvertently receive the video from the second transfer. Some VPS devices, notably the pyramid processing ASICs 212–218 can be placed into undesired states of processing due to the unintended receipt of video. Through monitoring when the crosspoint switch 202 is in the ERROR mode for a given path, this situation can be detected and remediating actions can be taken by the hardware control library of the processors 12.

As noted above, the VPM frame stores 204–210 are organized as 1K×2K pixel frame stores with triple-ported access capabilities. The frame stores are designed to be capable of performing a video read and a video store operation at full video rates (33 MHZ), with a third port available for random access of the frame store memory through the microprocessor data bus from the GCB 30. In a preferred embodiment, the frame stores 204–210 are each implemented with a Xilinx 4013 Field Programmable Gate Array (FPGA) as a memory (204–210) and frame store controller 240. The frame store memories 204–210 are themselves implemented using standard 1K×512 pixel video RAMs (VRAMs). However, with respect to video operations, the frame stores 204–210 are organized as 1K×2K pixel 2D frame stores. Thus, image read and store operations can be performed on any rectangular region-of-interest (ROI) that is present within the extent of the frame store memory 204–210. This enables multiple images to be easily stored within the frame store, and also enables sub-regions of the full image to be accessed.

During read operations, frame store controller 240, which is connected to a VPM local control bus 242 and passes through the input video data, controls the frame stores 204–210 to support a variety of different modes. Video reads can be performed with programmable amounts of nearest-neighbor pixel expansion, thus providing an output image that is a zoomed version of the original image. Also, video reads can be performed in interlaced mode, providing a mechanism for reading every other row in a frame store image. Interlaced mode is extremely useful when dealing with interlaced video, especially when the frame stores 204–210 are used as a video display. All video read modes support full two-dimensional ROI operation.

In a preferred embodiment of the invention, video store operations can also be performed with resampling of the image. During image stores, the image can be decimated (subsampled) by a programmable amount. When subsampling is used, the phase of the subsampling (indicating if the first, second, third, and so forth) pixel is the first pixel to be stored during subsampling. Also, the video store operation provides interlaced storing operations in the same manner as the video read operations. Video read and store operations are defined through programming a set of control registers within the frame store controller 240. The afore-mentioned RD_START signal within the VPS signals the beginning of read operations, providing synchronous readouts from all programmed and enabled frame stores.

However, the frame store controller 240 preferably has the capability of using separate, asynchronous read and store clocks for video operations. Although the frame stores 204–210 on the VPM 20 perform all read and store operations synchronous to the global VPS system clock, the frame store controller 240 is capable of using read and store clocks of different frequencies. Also, the frame stores 204–210 are capable of operating in a continuous read mode, where video is read based on external timing signals rather than through using internally generated video timing and the RD_START signal. The combination of separate read and store clocks and continuous read operation enables the frame stores 204–210 to be used both as a general-purpose frame store (as it is used on the VPM 20) and also as a frame store driving a video encoder for display output.

As noted above, the pyramid processing ASICs 212–218 are preferably implemented using a PYR-2 ASIC of the type described in U.S. Pat. No. 5,359,674 and U.S. patent application Ser. No. 08/838,096 (known as the "pyramid chip" and manufactured by the Sarnoff Corporation) with an 8-bit LUT 220, 222, 224, or 226 respectively connected to the OUT2 of the PYR-2 chip. The purpose of the pyramid module 212–218 is to provide fundamental filtering operations on video frames. The 8-bit LUT 220–226 at the output of the pyramid module 212–218 enables single image point-wise operations to be performed on images output from the pyramid module 212–218. Such operations include adding gain to an image, thresholding an image, and so forth. The LUTs 220–226 themselves are preferably implemented as 32K×8 SRAMs and are completely programmable for customized LUT transformations.

Those skilled in the art will appreciate that the combination of the pyramid modules 212–218 and frame stores 204–210 enables a wide variety of different image pyramids and other multiresolution image representations to be implemented completely within the VPM video hardware. Examples of the possible pyramid computations are provided in U.S. Pat. No. 5,359,674 and U.S. patent application Ser. No. 08/838,096.

CALU 228 is implemented using a Xilinx XC4010 FPGA or a Xilinx XC4028 as a CALU controller with dual FIFO buffers 230 at its input and a 512K×16 SRAM bank. The purpose of the CALU 228 is to provide dual-image operations using arbitrary, pointwise operations on the two images. The input FIFOs 230 are programmable through control registers in CALU 228 to both automatically compensate for any timing skew between the two input video paths, and also to provide a deterministic, programmable delay between the two images.

The automatic timing skew compensation between the two input video channels is achieved by analyzing the timing signals of the two input video channels. The input video channel that provides valid video data first is delayed until valid video data appears on the second video channel (limited only by the size of the FIFO). In this particular implementation, video data from both video channels is stored into the data FIFOs 230. When both FIFOs 230 have sufficient valid data stored, then the processes of reading the data out of the FIFOs 230 is started simultaneously on both channels. Each channel can then delay the start for reading the data out of the FIFOs 230 by a programmable delay.

The timing analysis section on the video channel inputs detects the number of active and blanking clocks on the input video channels, and then uses these numbers to construct an output video stream with the same timing parameters.

The automatic timing compensation can also be implemented in the PALU 232, but since it does not have explicit memory components (FIFOs) external to the chip it needs to use internal resources. For this reason some applications may choose not to include the timing compensation in the PALU or it may compensate for smaller timing differences.

CALU 228 performs the pointwise image operation through a 16 bit input and 16 bit output LUT, which generates a unique 16-bit output value based on the two input pixel values. The LUTs are implemented in SRAM and are programmable through software. Common operations, such as image multiplications, additions, and so forth can be implemented using these LUTs in a known fashion. More complicated operations (such as generating angle and magnitude of gradient data based on the horizontal and vertical partial derivatives of an image) are also possible with the CALU LUTs due to their programmable nature. In fact, any dual-image operation can be implemented in the CALU LUTs if the transformation generates a single output value for each unique pair of input values.

CALU 228 also has internally a 32-bit image accumulator. This accumulator enables one of the input images, or the output of the CALU LUT, to be accumulated over the entire extent of the image. This enables a fast method of determining the average value of an image, and can also be used for operations such as full-image cross correlation computations.

Preferably, CALU 228, as well as all other ALUs and FPGAs in the VPS of the invention, is reconfigurable for different hardware functions, where the reconfiguration is from software on one or more of the microprocessors 12 of the PM 10 through a JTAG interface.

PALU 232 has been designed as a reconfigurable device for numerous different video operations. PALU 232 is designed to be programmed through JTAG control, a serial communication channel designed for testing devices using boundary scan, by the microprocessors 12 on the PM 10 after power-on reset. PALU 232 has four video inputs and two video outputs, providing 16-bit dyadic function capability to the VPS.

PALU 232 has a 4M×32 DRAM connected to it, so that a large variety of processing functions can be implemented through a software configuration that may make use of a large, 32-bit wide, memory bank. PALU 232 can thus be programmed to perform a host of different video operations, depending on the configuration data that is used to configure the device. The architecture and operation of PALU 232 are described in detail in U.S. Provisional Patent Application Ser. No. 60/058,269 filed Sep. 8, 1997, also assigned to the present assignee.

VPD sites 234 and 236 on VPM 20 are provided for expanding and customizing the capabilities of the VPS. Specialized video devices such as video displays, video digitizers, correlation units, image warpers, and other processing units can be incorporated into daughterboard designs and added to the VPS. Each VPD site 234 and 236 has up to six crosspoint inputs and six crosspoint outputs for video to and from the VPM's crosspoint switch 202 depending upon which VPD is installed. Also, each VPD has four interrupts associated with it to coordinate interrupt-driven hardware control. As noted above, a critical concern for the design of the VPS of the invention was the efficient control of the hardware by a single or multiple processors. The video format, usage of the RD_START signal, and automatic timing compensation of the CALU 228 all enable the VPS to be easily and efficiently programmed in software. In order to allow the VPS to be controlled within a multitasking, multiprocessor environment, the VPM video devices must be controlled through interrupt-driven control. Interrupts provide a method for task switching and task blocking while tasks are waiting for video operations to complete. Without interrupts, tasks have to poll status bits within VPM video device status registers to determine when operations are complete. This does not lend itself well to fast task switching and efficient operation. The important interrupts in the VPS are interrupts that signal the completion of a video operation. Explained another way, interrupts must be generated by devices that serve as video sinks: video enters the device but does not leave the device. Devices and operations on the VPM 20 that are important for interrupt generation are:

The completion of store operations for a frame store 204–210.

The completion of operations within the CALU 228.

The completion of operations within the PALU 232.

The completion of relevant operations on a VPD.

If four interrupts are allocated for each VPD, the total number of interrupts that can be generated on the VPM 20 is 14 (4 for frame stores, 1 for CALU, 1 for PALU, and 8 for VPDs). Given that up to six VPMs 20 can exist within a VPS in a preferred embodiment, there are far too many interrupt signals to be run independently across the backplane to the PM 10 for interrupt generation. To reduce the problem of interrupt generation, an interrupt mask and flag register 244 is provided on each VPM 20, and only one interrupt is provided to the PM 10 from each VPM 20 in the VPS. Interrupts that are generated by a video device on the VPM 20 are transferred to the PM 10 only if the associated mask bit is enabled for the device. The mask and flag registers 244 are designed so that the mask and flag status bits may be atomically set and cleared by any of the microprocessors 12 on the PM 10 to ensure that no problems arise during multitasking and multiprocessor operation.

Preferably, a video synchronization signal is distributed across all VPMs 20 and VPDs so that parts of all of the video devices that interface to external video signals can be synchronized to each other. Specifically, the system display is usually synchronized to the video digitizer. This function provides for deterministic timing between some external video sources, and is very important for frame rate processing.

The control registers, LUT memories, and frame store memories on the VPM 20 can be accessed by the microprocessors 12 on the PM 10 through the GCB 40. As noted above, the GCB 40 is implemented as a CompactPCI™ bus where each VPM 20 has a PCI slave (GCB) controller 246 that decodes PCI accesses from GCB 40 and forwards accesses to devices on the VPM 20 via the internal local control bus 242 that resides within the VPM 20. Thus, each VPM 20 has its own local control bus 242 for control register and memory access.

GCB controller 246 may also function as a JTAG driver for providing configuration data to FPGAs of the VPM 20 and any daughterboards. In particular, the GCB controller 246 may provide the JTAG control for reconfiguration of the FPGAs on the VPM 20, such as the CALU 228, PALU 232, frame store controller 240, crosspoint state machine 238, and interrupt controller 244, as well as any FPGAs on the VPDs.

Finally, because the VPS of the invention is highly modular, it is essential that the current configuration of the VPS can be determined from software. CompactPCI™, which is used for the GCB 40, incorporates a protocol to identify which slots are occupied, and by which function. This protocol is preferably implemented on the PM 10 and VPM 20 boards in the VPS of the invention. In addition, each PM and VPM board preferably incorporates revision and hardware configuration information, while each VPD preferably incorporates a hardwired code as part of the board connector to identify the type and revision level of the VPD. This code can be read from a specific address location on the VPM 20. Once the VPD type has been established, the system software knows which basic registers to access on the VPD 20 to obtain more detailed information of the VPD, such as the VPD hardware configuration. In this manner, the system master can interrogate the appropriate registers throughout the VPS to identify and catalog all video devices in software.

Processor Motherboard

The Processor Motherboard (PM) 10 contains two major subsystems: the microprocessor subsystem 12, and the shared devices that each microprocessor subsystem 12 can access. The PM's microprocessors 12 have been generally described herein as microprocessors; however, in a preferred embodiment, PM 10 uses specialized Digital Signal Processors (DSPs) 12 as its general-purpose microprocessors.

Figure 3:
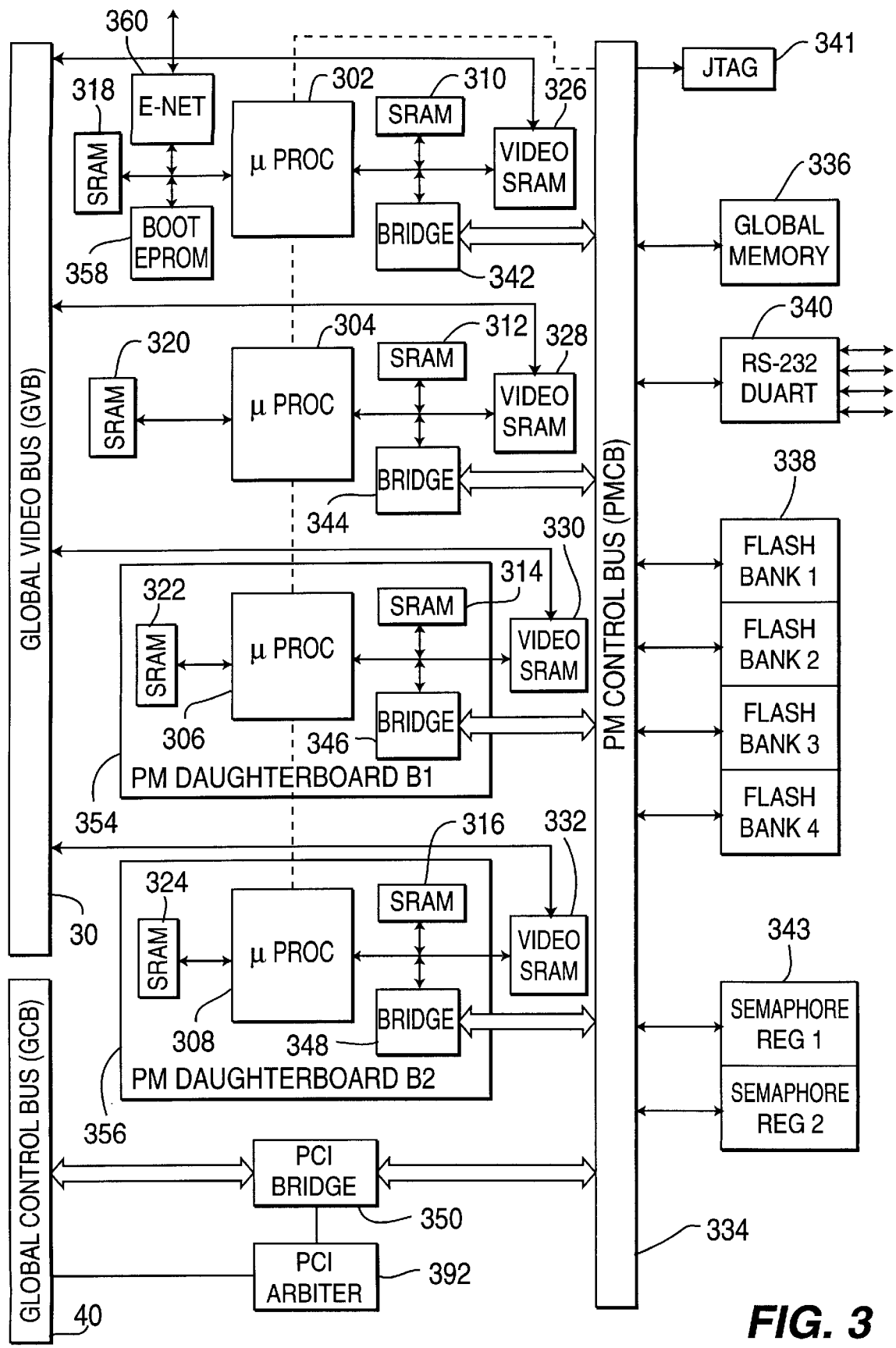
FIG. 3 is a block diagram of the Processor Motherboard (PM).

A top-level block diagram of PM 10 is shown in FIG. 3. As shown, the top-level PM architecture is comprised of four microprocessor blocks 302–308. In a preferred embodiment, each microprocessor block 302–308 comprises a Texas Instruments TMS320C40 DSP running independently at 60 MHZ, and each microprocessor 302–308 has three banks of local SRAM: a data SRAM area 310–316, a program SRAM area 318–324, and a video SRAM area (VSRAM) 326–332. Each of these local SRAMs are only accessible by the local microprocessor 302–308 via its local busses. In addition, PM 10 has a set of shared resources that are accessible by all of the microprocessors through an arbitrated control bus 334, called the PMCB (PM Control Bus). The PMCB 334 arbitrates transactions from each of the microprocessors 302–308 in round-robin fashion, thus enabling all microprocessors to access these resources without software exclusion or software arbitration.

In a preferred embodiment, the devices on PM 10 that are shared resources include up to a 4M×32 DRAM memory area 336 for global data storage. This DRAM area is used as a memory resource for transferring large amounts of data between microprocessors, and is memory-mapped into the address of each microprocessor at identical locations. The shared resources also include a non-volatile 4M×16 flash EPROM memory 338 which is used for program and data storage for embedded startup and execution. The flash memory 338 is reprogrammable by any of the microprocessors for "burning" new data and program executables for embedded operation. On the other hand, external communications to the PM 10 are provided through four shared RS-232 channels. Two DUARTs 340 are provided on the PMCB 334, enabling the microprocessors 12 to access the UART for any of the four channels to send and receive data. Also, JTAG emulator port 341 access for all microprocessors 302–308 may be provided via PMCB 334. PMCB 334 further provides access to specially designed hardware mutual exclusion semaphore registers 343 as well as access to microprocessor bridges 342–348 which contain interrupt flags and registers, a controller for the associated VSRAM, and an interface for connecting the microprocessor's local bus and PMCB 334. PCI bridge chip 350 provides an interface between the PMCB 334 and the GCB 40 and functions as the master controller of the GCB 40 (as defined in the CompactPCI™ standard), while PCI arbiter 352 handles arbitration of multiple PCI devices on the PCI backplane as described in the CompactPCI™ standard for the Global Control Bus 40.

As illustrated in FIG. 3, PM 10 has two microprocessors and all four Video SRAM (VSRAM) memory areas on the actual motherboard, along with all shared resources. Two processor daughterboard sites 354 and 356 are present for adding a third and fourth microprocessor 306 and 308. The processor daughterboard sites 354 and 356 are identical and preferably contain a single C40 DSP 306 or 308 with associated program and data SRAM. The connectors from the processor daughterboard sites 354 or 356 to the PM 10 connect all relevant microprocessor busses and control signals to the PM 10. Thus, PM 10 has four microprocessor blocks 302–308 within its architecture. Two of the microprocessor blocks 302 and 304 reside on PM 10 itself, while the other two microprocessor blocks 306 and 308 are optional and can be installed as daughterboards on PM 10.

Preferably, each microprocessor block contains a C40 DSP, each DSP operating from an independent 60 MHz clock, while the global resources of PM 10 operate from the same 33 MHz clock as the GCB 40. The microprocessor has 128K×32 or 512K×32 SRAM banks (e.g., 310, 318) connected to its two external data busses. The purpose of these two SRAM banks is to provide local, zero wait-state memory for program storage and data that is required for local microprocessor processing. Each microprocessor in PM 10 also has an identical memory map except that the memory map of microprocessor 302 has additional devices. The local resources are mapped into the same areas in each microprocessor, and shared resources are also mapped to the same addresses. In addition, all VPM components are also mapped to the same addresses. This removes any requirement for different memory maps and different linking commands for executable programs on different microprocessors. Each microprocessor also has a third SRAM area called Video SRAM, or VSRAM (e.g., 326). The VSRAM is organized as a 512K×16 SRAM area. The VSRAM is connected through interface circuitry (not shown) to the GVB 30, and can send or receive video information in the same format that is used by the VPM 20 and the GVB 30. Two image data paths are connected to each VSRAM from the GVB 30, thereby providing up to 66 Mbyte/sec data transfers directly to the VSRAM from GVB 30 sources.

The purpose of each VSRAM is to provide video information to the microprocessor 12 from the video devices on the VPMs 20 in an efficient manner. After storage in the VSRAM, the microprocessor 12 can operate on the image information in the VSRAM without utilizing any shared resources on PM 10. Thus, each of the four microprocessors 12 on PM 10 can be receiving, sending, or processing image information using their VSRAMs without interfering one another or utilizing each other's resources. This efficient transfer and analysis capability of the microprocessors with the VSRAM is paramount for fast video operations in a real-time environment.

Those skilled in the art will notice that the VSRAM has been defined as a 16-bit data area, which provides some difficulty for the C40 architecture, which is inherently only a 32-bit word width. Through accessing the VSRAM through different memory-mapped areas, reads from the VSRAM can be performed to access only the least-significant or most-significant bytes of the values in the VSRAM, or full 16-bit integers, both with and without sign extension. This provides for very efficient methods of handling data of different word widths with signed and unsigned data without additional consideration on the part of the software that is interpreting the VSRAM data.

Though not shown in FIG. 3, those skilled in the art will also appreciate that the TI C40 DSP architecture provides six asynchronous communications ports for processor to processor communications. Each of the four microprocessors 12 of PM 10 are connected to one another using two of these asynchronous ports. Thus, each microprocessor 12 has a send and a receive port to every other microprocessor in the VPS. This provides for fast, efficient DMA transfers of data between microprocessors that has minimal impact on microprocessor performance and does not utilize global resources on PM 10. Each C40 DSP also has five external interrupts. Each of these five interrupts is connected to an interrupt flag and interrupt mask register in bridges 342–348 that is local to the microprocessor 12. These flag and mask registers are used to multiplex multiple external interrupts from the UARTs 340, PCI bridge 350, VPMs 20, and other microprocessors 12 to the interrupts that are directly connected to the microprocessor. This provides the mechanism for each microprocessor 12 to respond to a wide variety of interrupt requests from other PM devices and from VPM devices as well.

In a preferred embodiment of PM 10, there are two hardware semaphore registers 343 which are available as shared resources on the PMCB 334 and have been specially designed to facilitate hardware control execution and coordination by multiple tasks on the microprocessors 12. These semaphores exhibit the following behavior:

When the semaphore register value is 0, a data value written to the semaphore register is stored in the semaphore register 343;

When the semaphore register value is non-zero, a data value written to the semaphore register will not affect the value of the semaphore register 343; and If a 0 value is written to the semaphore register, the semaphore register 343 will be set to 0.

This semaphore register 343 provides a means for performing multitask and multiprocessor mutual exclusion without exorbitant amounts of overhead. Certain critical control signals and registers in the VPS system (most importantly, RD_START) should only be accessed by one task at a time. Through using this semaphore register 343, tasks are "granted" the mutual exclusion semaphore when the unique value the task writes to the semaphore register 343 is read back from the semaphore register 343. When the task is finished with the operation, the task writes a 0 value to the semaphore register 343, effectively "freeing" the semaphore and allowing another task access. Without this semaphore register 343, complicated interrupt and multiprocessor cooperation would need to be implemented, which would reduce the real-time processing potential of the PM's microprocessors 12 to perform hardware operations. The use of the mutual exclusion semaphore also provides an efficient means of task to task and microprocessor-to-microprocessor mutual exclusion for key VPS resources.

As illustrated in FIG. 3, one of the four microprocessors 12 on the PM 10, microprocessor 302 in the illustrated embodiment, has special local resources associated with it that are not available to the other microprocessors 12. One of these local resources is a boot EPROM 358 for power-on booting of software. While other microprocessors 12 are held in reset mode, waiting for booting information over their communications ports, microprocessor 302 automatically boots from its local boot EPROM 358. This enables embedded software to be placed on the PM 10 after manufacture, and ensures that PM 10 will always initially boot up with a baseline set of software. Once initial booting of microprocessor 302 is complete, new programs can be loaded and executed by microprocessor 302 out of flash memory 338, and microprocessor 302 can also instruct the other microprocessors to boot as well.

Another local resource available only to microprocessor 302 is a 10BaseT Ethernet controller 360. Controller 360 enables microprocessor 302 to perform Ethernet communications. The Ethernet controller 360 is placed on the local bus of microprocessor 302, rather than in the shared resource area supported by the PMCB 334, because of the potentially high volume of data that can be provided over the Ethernet communications link. This Ethernet controller 360 is preferably implemented using a AMD C-LANCE Ethernet device and also has a 512K×16 SRAM area for Ethernet packet storage. In a preferred embodiment, Ethernet controller 360 functions as a JTAG driver, which provides a serial communication channel via JTAG port 341 for testing and reprogramming the FPGAs of PM 10 from software provided over Ethernet. This allows later system upgrades to be provided by simply downloading a new configuration file into the FLASH memory bank 338 and allows video processing functions to be changed based on the requirements for the application program. Specifically, the Ethernet controller 360 may comprise an FPGA which is programmed to provide a control interface which provides the JTAG control on the PM 10 for reconfiguration of the FPGAs on the PM 10, such as bridges 342–348, PCI bridge 350, PCI arbiter 352, and a controller and arbiter of the PMCB 334 (not shown). Since PM 10 was designed to optimize the video processing operations of the VPS as much as possible, PM 10 was designed to support multitasking, multiprocessor operation with a minimal amount of software programming and overhead. In accordance with the invention, all microprocessor-intensive operations, including the execution of programs, access of local data, and access to video information, has been localized to each of the microprocessors. This minimizes the amount of global VPS resources that are utilized for these intensive operations, and maximizes performance when multiple microprocessors are employed for a given application. As noted above, the VSRAM provides a further extension of this philosophy through providing dedicated video paths to each of the microprocessors 12, thus removing any bottlenecks associated with memory and bandwidth constraints from the video hardware to the microprocessors 12. The memory mapping of the VSRAM for 8- and 16-bit sign and zero extended read operations optimizes the accesses into the VSRAM for variable-width data with the C40's 32-bit only architecture.

The shared resources on the PM 10 have been carefully considered to also maximize performance and flexibility. The four UARTs 340 on PM 10, for example, are globally accessible because this enables all microprocessors 12 to communicate with external devices without microprocessor-to-microprocessor overhead. This is acceptable also because the bandwidth and frequency of interrupts from the UARTs are relatively small in comparison to the power of the microprocessors 12 themselves and the speed of the associated PM busses.

In a preferred embodiment, PM 10 also includes a hardware control library (HCL) for real-time video processing.

As will be explained in more detail below, the HCL is designed for efficient real-time operation in a multitasking and multiprocessing environment. The HCL architecture allows the VPS to be scaled smoothly from relatively small systems with modest amounts of hardware to very large, powerful systems with significantly more hardware. In addition, the modularity of the design enables the VPS to be custom tailored to specific applications through the addition of new processing components and the reconfiguration of available devices. The HCL, through its modular and extensible architecture, makes it readily applicable to the diverse set of VPS systems that can be developed.

As noted above, parallel-pipelined video processing architectures, such as the VPS, are capable of performing video operations in a highly optimized fashion with very fast speeds. The VPS, for example, can process multiple streams of imagery at a deterministic rate of 33 Mpixels/sec for each video stream. This performance is achieved through the use of special hardware devices that are specifically designed to perform operations such as convolution, simple image point-wise arithmetic, look-up table operations, and other such operations. The hardware devices that process the video are typically controlled using memory-mapped control and status registers. Through writing values into the control registers for different devices, the devices are commanded for performing different operations.

An example of this is a frame store read operation, where an image is to be read from a frame store for processing and/or storage. A typical set of parameters for a frame store read operation with the VPS will include the following:

The size of the image to be read out of the frame store;

The location of this image within the frame store memory;

The horizontal blanking time for this image when it is read out; and

Expansion (or zoom) that can be applied to the image when it is read.

Unfortunately, having the programmer, who is writing an application that uses this video hardware to perform a complex set of video processing operations, program these registers using standard in-line memory accesses to programmable control registers is obviously prohibitive. The code that results from this sort of programming is quite unreadable. Errors or changes to the frame store design requires modifications to all places in the application that uses the frame store. The location of each set of frame store registers must be known a priori, and cannot be modified once they are fixed in the application. A more reasonable solution to the programming of hardware devices in accordance with the invention is to use a library of high-level, C-callable functions loaded on any or all of the microprocessors 12 of PM 10 to program the video hardware. The programmer, rather than being presented with a set of control registers for each device, is provided an application programming interface (API) that uses simple to understand syntax and data structures that "hide" or otherwise simplify the actual operations required to command the hardware.

As an example, consider the problem of reading from a frame store and storing that image into another frame store. Rather than manually programming numerous control registers (this can be in excess of 15 registers for each frame store), the programmer can instead use a set of function calls as follows:

par( );
   fsRead(image1);
   fsStore(fsimgOutput(image1), image2);
endpar(fsimgVDEV(image2));

Using this syntax, it is much more obvious to understand what is happening with this control loop. An image, called image1, has been defined to reside within the source frame store. All of the information about that image (its size, its location, etc.) is encapsulated in this image structure. The destination is defined as image2, which resides in another frame store. The par( ) function indicates to the library that the operations are to be performed in parallel. The endpar( ) function at the end of the operation serves three functions: to signal the last of a group of operations that is to be performed in parallel, to enable the operation and begin execution of the operation, and to wait until that operation completes. The argument that is passed to endpar( ) indicates that the function is to wait until the store of image image2 is complete.

The functions fsRead( ) and fsStore( ) handle all of the control register programming for the frame stores. The information required to program the control registers is embedded in the image definitions for image1 and image2. The crosspoint switch routing for sending the image from the source to the destination is handled through the fsimgOutput( ) function, which indicates that the output of the first frame store is to be routed to the input of the second frame store. This keeps the programmer from having to explicitly program the control registers for routing the video, and allows for consistency checking with the programmer's operations.

There are a number of rigorous requirements that must be met for a hardware control library to be efficacious for real-time video processing. Perhaps most fundamentally, it must be recognized that the HCL is to be operated within a real-time framework, meaning that the time required to perform video hardware operations must be deterministic and predictable. Likewise, due to the complexities of the video hardware processing multiple operations, a multitasking environment is usually required. This enables the programmer to set up parallel tasks that operate on different portions of the video processing operations with different pieces of hardware simultaneously. The preferred embodiment of the HCL is built on the foundation of a real-time operating system (RTOS).

In addition, great care must be taken to keep the hardware control library flexible for the programmer. Instances of this flexibility include the easy reuse of significant portions of software, the ability of the hardware control library to handle systems with different numbers and types of video hardware, and the efficient hiding of complex low-level system interactions that can cause applications to be inordinately complex and difficult to maintain.

A final requirement of the hardware control library is that it is efficient to operate. Within the multitasking environment, task switching must be fast with low overhead. The amount of time taken to program the control registers, perform consistency checking, and perform other bookkeeping tasks in software for the hardware control must be kept to a bare minimum to reduce overhead. The use of a real-time operating system that provides multitasking control, interrupt-driven operations (including communications), semaphores and mailboxes, preemptive operation, and other such features is a foundation that must be supplied for a fully effective HCL.

Some systems use interpreted languages (usually with syntax similar to the C programming language) to generate hardware control register accesses through the parsing of source program files. This method of programming has the net effect of "hiding" the programming of control of the hardware and also providing very efficient, in-line code that is compiled into the final executable system. Typically, because of a combination of hardware architecture constraints and the HCL software architecture, these libraries are usually not supported within a multitasking environment. This is usually caused directly because the code provided does not support reentrable operation—defined as the ability of software functions to be interrupted and called again by another task without side effects—or because the software handles hardware resources that cannot handle multiple tasks instructing them to perform operations simultaneously. Another unwanted side effect of parsing code and "recompiling" the code is that dynamic control of the hardware is usually impossible. Parameters such as image sizes, the sequence of hardware operations being performed, and the type of processing used by a particular application must be defined in advance to be compiled correctly. This removes the HCL's ability to perform dynamic processing with varying image sizes, regions of interest, or even dynamic sequencing of events based on measurements or decisions based on the video data. This has obvious constraining consequences that can make real-time video processing applications difficult to impossible to implement with the desired performance and maintainability. These restrictions are usually due to the underlying architecture of the video hardware and its reliance on a priori timing for handling certain delays and resource management that cannot be efficiently determined during real-time operation.

Other libraries provide functions that can be called from a high-level language such as C and C++. These libraries, although capable of handling reentrable operation, are usually not designed to do so. Furthermore, they typically are not designed to be used within the framework of a real-time operating system or, if they do support linking to a real-time operating system, they do not allow for hardware control to be performed using concurrently running tasks.

The net result of these lack of features in the different types of hardware control libraries is that they do not provide a robust and effective set of tools for video processing. A lack of multitasking support means that code must be written as a sequential sequence of operations, which does not lend itself well to programming and can make certain tasks that are supposed to run simultaneously almost impossible to implement effectively. A priori analysis of the image processing operations being performed requires the programmer to determine a set of processing constraints in advance, which does not allow the full power of the video processing hardware to be utilized. Accordingly, the HCL for the VPS of the invention has been designed to overcome these limitations.

Those skilled in the art will appreciate that the most fundamental aspect of programming the VPS hardware of the invention is the transferal of video between storage devices, video input devices, and video output devices. During the transfer, the video frames can be passed through any number of processing units which modify the video data as it is passed through. The result of this type of operation is that the amount of time it takes to process an image is approximately the same as the amount of time required to perform the transfer. The throughput of video remains the same always: pipeline delays are introduced by processing devices as required to perform their operations, and these pipeline delays are usually very small durations in comparison with the entire image transfer time.

In the VPS of the invention, video flows through different boards through the use of crosspoint switch 202. Every time video must travel between two devices, the crosspoint switch 202 is used. All video device inputs and outputs are connected to this crosspoint switch 202. A fundamental principle of such a hardware architecture is the parallel operation block. The purpose of the parallel operation block is to configure a set of devices to begin operations synchronously and in parallel. An example of this might be a process where two images are read from frame stores, added together, and the resulting sum image is stored into a third destination frame store. The processing unit (the adder in this case) must either receive the two video signals at the same time (synchronously) or it must compensate for the differences in timing between the two signals. In order to reduce the timing differences, the two frame stores are read synchronously. The afore-mentioned signal, RD_START, commands the two frame stores to begin their read operations on the same clock cycle. This ensures that there are no delays between the reads. Thus, these two operations are performed in parallel, and are considered within the same parallel operation block. Once started, the video processing operation will complete without further supervision.

An example showing this operation can be explained with reference to FIG. 2. For example, two images defined in frame stores 204 and 206 are read using a frame store read command. The outputs of frame stores 204 and 206 are then routed by the crosspoint switch 202 into an image adder of CALU 228, which performs a pointwise image addition on the two input video frames, providing an output image as its result.

This sum image is then routed by the crosspoint switch 202 to the destination frame store, such as 208, where it is stored. Through performing this within a parallel operation block, and starting the operation with the RD_START signal, the two images read from frame stores 204 and 206 will be guaranteed to read out synchronously, thus not introducing differences in video timing at the input of the image adder of CALU 228. Those skilled in the art will appreciate that for the CALU 228 it does not matter if the two images start at the same time, for the CALU 228 automatically compensates for differences in timing; however, other functions in the VPS of the invention do not necessarily compensate for the timing difference (i.e., PYRs 212–218 and PALU 232).

Once the RD_START signal is given, a different set of frame stores and other devices can be programmed and enabled. Like the first example, these devices will not begin operating until the RD_START signal is provided. These devices can be programmed and enabled while other video operations with different hardware are still executing, and the assertion of another RD_START will not interfere with the video operations already underway.

A brief example will be used to introduce the basic HCL syntax that is used by programmers to perform video operations. Consider the video operation just described. In HCL syntax, the operation could be performed with the following sequence of function calls:

par( );
fsRead(image1);
fsRead(image2);
aluAddImage(fsimgOutput(image1), fsimgOutput(image2), add_device);
fsStore(vdevOutput(add device), image3);
endpar(add_device);

This sequence can be explained as follows:

par( );
The call to this function indicates to the HCL that a parallel operation block is to be started.
fsRead(image1);

fsRead(image2);

Two images, already defined in the frame stores 204 and 206 by the programmer, are instructed to be read from their frame stores. Using the definitions of the image, including the image's location and size within the frame stores, the frame store read operations are set up in the frame store devices 204 and 206. The actual read operation does not yet occur.

aluAddImage(fsimgOutput(image1), fsimgOutput(image2), add_device);

This function performs multiple operations. First, the crosspoint is routed from the output of the two frame stores 204 and 206 into the inputs of the image adder of CALU 228. Secondly, the image adder of CALU 228 is programmed to add the images as appropriate.

fsStore(vdevOutput(add-device), image3);

This command performs two functions. First, it connects the output of the image adder of CALU 228 to the input of the destination frame store 208 using the crosspoint switch 202. Second, it programs the destination frame store 208 to prepare for storage of the image.

endpar(add_device);

This is the function that terminates the parallel operation block. This function fires the RD_START signal to begin read-out from the frame stores 204 and 206, which will then automatically be sent through the adder (as defined in the crosspoint switch routing already performed) and subsequently stored into the destination frame store 208. This function will also cause the RTOS to block the task (terminate further operation of the task calling these functions) until the adder completes its operation. Thus, other operations in other tasks are rescheduled and can continue processing until the addition operation is complete.

In accordance with the invention, the concept of a video device (VDEV) is introduced to encapsulate information about the different devices within the VPS in a way that enables the programmer to use the devices without understanding the underlying information about the device at a low level. For example, take the add_device variable that was used in the previous example. Using the add_device definition, the programmer was able to use the adder to its full effectiveness. Encapsulated in the add_device definition (which is implemented as a C structure within the HCL) is all of the information about the location of the adder's control registers, the crosspoint inputs and outputs of the image adder of CALU 228, and the interrupt information used to determine when the adder operation is complete.

The VDEV is preferably implemented within the HCL as a C structure. All video hardware components within the VPS, including frame stores, pyramid modules, CALUs, PALUs, daughterboard devices, and so on are all represented within the HCL with one (or more) VDEV structures. Preferably, frame store image definitions include within their definition the VDEV for the frame store where the image resides. Thus, through accessing the VDEV corresponding to the image, the low-level information about the frame store can be determined. Different devices have different configurations of control registers, crosspoint inputs and outputs, and other unique features. Some of the common features for all devices are a part of all VDEV structures (the most fundamental of which is a field that indicates the video device type that is represented with the VDEV). Other features, such as the location of control registers or other device-dependent memory areas, are stored within device-specific fields of the VDEV structure.

Different HCL functions are provided for different devices. For example, the functions that manipulate an image adder are different than those which manipulate the frame stores to perform video, read and store operations. The VDEV provides pointers and other information that enable the device to be manipulated, and the functions that are provided for operating a device contains the methods used for using the VDEV information for commanding the device. So, in the case of the frame stores, the VDEV will indicate where the frame store control registers in the frame store controller 240 are located, but the frame store functions (such as fsRead( ) and fsStore( )) contain the know-how to manipulate the frame store registers to perform video reads and video stores.

This idea of encapsulating the video devices into a common structure and using functions for the devices to manipulate the VDEVs is an important concept for the HCL. This architecture enables new devices, usually implemented as VPS daughterboards, to be added to the HCL without having to change the methods that are used to manipulate the other devices. Using common image formats and a common routing resource (crosspoint switch 202), the video data interfaces to these devices are defined and all additional know-how to operate the devices are placed into new functions that operate on the devices. This also enables the HCL to scale according to the devices that are present within a system. If a given VPS system does not have a certain type of device, for example, the programmer will not try to use functions that manipulate that device. This, in turn, means that these functions are not linked into the programmer's final application. Thus, the programmer's application will only contain the functions required to perform their application, and not also contain other superfluous functions that take up valuable memory space.

Since the VPS does not contain just one processor on its PM 10, the HCL must be capable of being executed concurrently on one or more of these multiple processors to be effective. In order to have the HCL run effectively within such a multitasking architecture, the HCL functions must be reentrable. The HCL has been designed with this in mind, and all functions are reentrant, or they are mutually excluded and appropriately guarded against the possibility of being reentered, as explained below. The VDEV structure, and its use with functions that operate on different video devices, enables each task to pass all relevant information about a video operation to functions within the HCL over a task's stack frame rather than using statically-allocated data. This, in turn, enables the HCL to easily be made reentrant. Furthermore, the VDEV structures themselves are not modified in any way during operation. Thus, multiple tasks on the same processor can use the same VDEVs without conflict.

One potential problem with multitasking within the HCL is the use of the RD_START signal within parallel operation blocks. The programming of the hardware and the use of RD_START must be mutually excluded between independently operating tasks. If this exclusion is not performed, the assertion of RD_START by one task might prematurely start operations that are being set up by another task that is also setting up the hardware. This mutual exclusion can be supported by most real-time operating systems in software using semaphores, mailboxes, or other such constructs, but this can incur significant overhead. This overhead is exacerbated when multiple processors need to pass a single exclusion semaphore. To alleviate this problem, a hardware semaphore is provided within the PM 10. As noted above, this hardware semaphore is read/write register 343 on PM 10 that is visible to all microprocessors 12. The pre-defined behavior of the semaphore was noted above.

This semaphore enables mutual exclusion of multiple tasks and multiple microprocessors 12 through the following method:

1. A task wanting the semaphore will write a unique value to the semaphore register 343.
2. If the task reads back the value from the semaphore register 343, the task has been granted the semaphore. The task then performs the desired operations and then goes to Step 4.
3. If the task cannot read back its value from the semaphore, the task will block (yield), waiting for an interrupt from another microprocessor 12. This interrupt is only used for sending the message that the semaphore has been released. When the interrupt signaling that the semaphore has been released is received by the microprocessor 12, the microprocessor 12 will go back to Step 1.
4. When the microprocessor 12 has completed its desired tasks, it writes a value of 0 to the semaphore register 343 and interrupts all microprocessors. Then its processing continues.

Using this semaphore in this manner enables all tasks and all microprocessors 12 to arbitrate for the ability to program the hardware control registers and use the RD_START signal. The par( ) function serializes access to the video hardware on a single processor. Multiple processors may program the video hardware simultaneously as long as devices are not enabled or GVB ports are not needed. When a processor must enable a device or acquire a GVB port, then it must exclude other tasks from performing these same operations by acquiring the semaphore. When the endpar( ) function is called, the RD_START signal is asserted, the semaphore is released, and the task blocks (yields) until an interrupt is received indicating that the video processing operation is complete. In particular, when the endpar( ) function is called, the RTOS will cause the task to block until a specified hardware device (indicated by the VDEV argument passed to the endpar( ) function) generates an interrupt. Interrupts by video devices are only generated at their completion, so no unwanted interrupts are generated. This blocking of the task enables other tasks to continue processing while the task calling endpar( ) waits for the hardware operation to complete.

Although it is possible to poll the status registers of the hardware devices to determine the conclusion of a particular operation, polling does not provide an efficient use of the microprocessor's resources, and is not appropriate within a multitasking framework. Thus, rather than using polling, the video devices of the present invention generate interrupts which are then multiplexed to each of the microprocessors 12.

As noted above, in a preferred embodiment of the invention, there are 14 different interrupts that can be generated by each VPM 20 for a VPS which can have up to 6 VPMs 20. As also noted above, an interrupt flag and mask register 244 is available on each VPM 20 which processes the interrupts and lets unmasked interrupts pass to the PM 10. The PM 10 therefore receives only one interrupt for each VPM 20.

Clearly, when a task is waiting for an interrupt from a given VPM 20 that contains a device that is being waited for, the task cannot assume that any interrupt from the VPM 20 indicates the device that the task is waiting for. The interrupt service routine that services the VPM 20 interrupts thus checks the flag register 244 on the VPM 20 to determine whether or not the given interrupt from the VPM 20 is the desired interrupt. If the desired interrupt has been generated, the mask register 244 is turned off (so the interrupt is not generated again inadvertently) and the flag register 244 is cleared.

Since there is an opportunity for race conditions to occur between tasks that are manipulating the interrupt mask and flag registers 244 on the VPM 20 concurrently, the mask and flag registers 244 are designed such that individual mask and flag bits corresponding to single interrupts can be set and cleared atomically, rather than through a more standard read-modify-store operation. This atomic manipulation of the interrupt registers 244 on the VPM 20, coupled with an assumption that only one task at a time will wait for a given device On a given VPM 20, removes all potential race conditions that can occur with the VPM interrupt registers 244.

In the rare case where the VDEV contains information about the state of a given device (such as which look-up table banks have already been allocated for a programmable LUT), the state information is stored in the shared DRAM area 336 of the PM 10 and is linked to the VDEV by a pointer. Accesses into DRAM area 336 are mutually excluded using a hardware semaphore that is similar to the hardware semaphore used with the par( ) and endpar( ) functions. Since accesses of this nature are typically not within the time-critical loops of the application execution and will occur under normal circumstances only during initial startup and allocation, this semaphore is polled by tasks. Other DRAM operations not requiring mutual exclusion do not utilize the semaphore.

The HCL of the invention is intended to support multiple processors; however, it also needs to be recognized that there are a number of operations that need to be performed to detect and initialize the hardware before the hardware can be used for processing. Also, the startup of all microprocessors 12 on the PM 10 needs to be carefully choreographed to ensure that no race conditions result, especially at power-on initialization. The "primordial" startup is the first level of startup that the HCL performs. During primordial startup, only one microprocessor (microprocessor 302 by default) performs a sequence of steps to initialize the VPS hardware. The steps of the primordial startup and why these steps are important will now be explained.

Since the VPS of the invention is designed so there can be varying numbers and types of motherboards and daughterboards, the HCL must be aware of the configuration that is present and be able to accommodate all possible permutations of the devices that are present by automatically detecting the available hardware. Preferably, all VPMs 20 and VPDs can be uniquely identified through accessing specific control registers. The presence or absence of boards in motherboard slots or daughterboard sites can also be identified. The primordial startup routine will interrogate all possible slots for VPMs 20, and then will interrogate all daughterboard sites on each detected VPM 20 to find daughterboards.

When a video device is detected, the primordial startup will allocate a VDEV in DRAM 336 and place the appropriate device information for the detected device into that VDEV. Thus, at the end of the primordial startup, a complete set of VDEVs describing all of the detected devices in the VPS is present in the global DRAM 336. Since this information is in global DRAM 336, all devices can access and use the information.

Most video devices require some sort of power-on initialization. When devices are detected and VDEVs are allocated for the devices in global DRAM 336, the devices are initialized by the primordial startup to ensure that they are in a known and valid state before processing begins.

The other microprocessors 12 present on the PM 10 are prevented from accessing the video devices during the primordial startup. When microprocessor 302 completes the primordial startup, it sends appropriate signals to the other microprocessors. Once this occurs, all microprocessors 12 will begin their startup. This startup instantiates all information that is local to the microprocessor 12 which is required for execution of the HCL. Preferably, each microprocessor 12 keeps its own local copy of all of the VDEV information that is established during primordial startup, and all VDEV information is copied by each microprocessor 12 into its local data SRAM area.

Keeping VDEV information local to each microprocessor 12 is crucial for the efficient operation of the HCL. Since all microprocessors 12 have both an executable copy of the HCL and all of the device information local to the microprocessor 12, hardware programming and other operations can be performed with a minimal amount of accesses outside of the microprocessor's local bus. This keeps the common busses on the PM 10 and VPMs 20 free of much of the data transaction traffic that would otherwise be required. Using this strategy, virtually all of the traffic on the PM 10 and VPM 20 global busses is for hardware register programming only. The only other traffic includes occasional accesses to DRAM for global data about the video devices, and access to communications resources that enable the microprocessors 12 to communicate with external computers.

After the VDEV information is copied into local SRAM of each microprocessor 12, the microprocessors 12 then start their tasks. Each of the tasks can then use the VDEV information that is present in local SRAM to perform video operations, and execution is begun. Each task is defined to use a set of VPS video device resources. Since any task can access any video devices, it is left to the programmer to determine which tasks can access which pieces of video hardware at a given time. Since all execution within the HCL and with the VPS hardware is deterministic in execution time, the programmer is able to accurately segment the time that different tasks use different devices. Multitask and multiprocessor semaphores, provided by the real-time operating system environment, enable the programmer to coordinate task execution with other tasks in a uniform manner. Unfortunately, this is the responsibility of the application programmer because the amount of bookkeeping that is required for the run-time allocation and checking of a large number of devices would be too high to enable the HCL to run in real-time. However, the crosspoint state machine 238 described herein alleviate this bookkeeping requirement.

The crosspoint switches 202 present on each VPM 20 are primarily responsible for connecting video devices together for video operations. Since the programmer segments the different video operations into different tasks that at any one time use a non-overlapping set of resources, and because the crosspoint switch 202 on the VPM 20 is large enough to handle any set of connections between devices, there is no need to dynamically check and allocate the crosspoint routing resources between devices on a single VPM 20. The crosspoint channels that are present to communicate between VPMs, however, using the Global Video Backplane, require dynamic allocation. The HCL "hides" the transactions between VPMs 20 internally to the HCL so that the programmer does not need to allocate the active backplane routing resources explicitly. However, the backplane is a routing resource that has a finite amount of bandwidth, and therefore there can be contention for the backplane video channels.

The crosspoint state machines 238 in each VPM 20 provide a mechanism for dynamically allocating the backplane routing resources. The crosspoint switch state machines 238 indicate when a crosspoint channel is in use or is currently available. Since, through mutual exclusion, only one task on all microprocessors 12 is programming the video hardware at a given point in time, there are no race conditions for the crosspoint state machines 238. Thus, when a given task needs to route video between VPS boards, each of the available outputs from the source VPS board is interrogated through the crosspoint state machine 238. If all outputs are currently taken, then the HCL aborts. Otherwise, an available resource is used for routing, and this resource is automatically marked as busy by the state machine 238 until the video transaction is complete.

As a result, the use of the crosspoint state machine 238 is paramount for handling board-to-board video transfers. Without this state machine 238, the HCL would have to maintain equivalent information in a globally accessible location. This would require releasing the resource when the video transfer was done. Doing this would require additional bookkeeping and would increase the number of processor operations required in endpar( ).

Video Processing Daughterboards

The Video Processing Daughterboards (VPDs) are added to each VPM 20 to provide specialized functions. Each VPD has, in addition to a control bus, a number of video input and output ports that are directly connected to the VPM crosspoint switch 202. In a presently preferred embodiment of VPM 20, two VPDs can be installed, with each VPD having up to six video input ports and six video output ports. Four sample VPDs implemented in the presently preferred embodiment of VPM 20 will now be described with respect to FIGS. 4–8.

Figure 4:
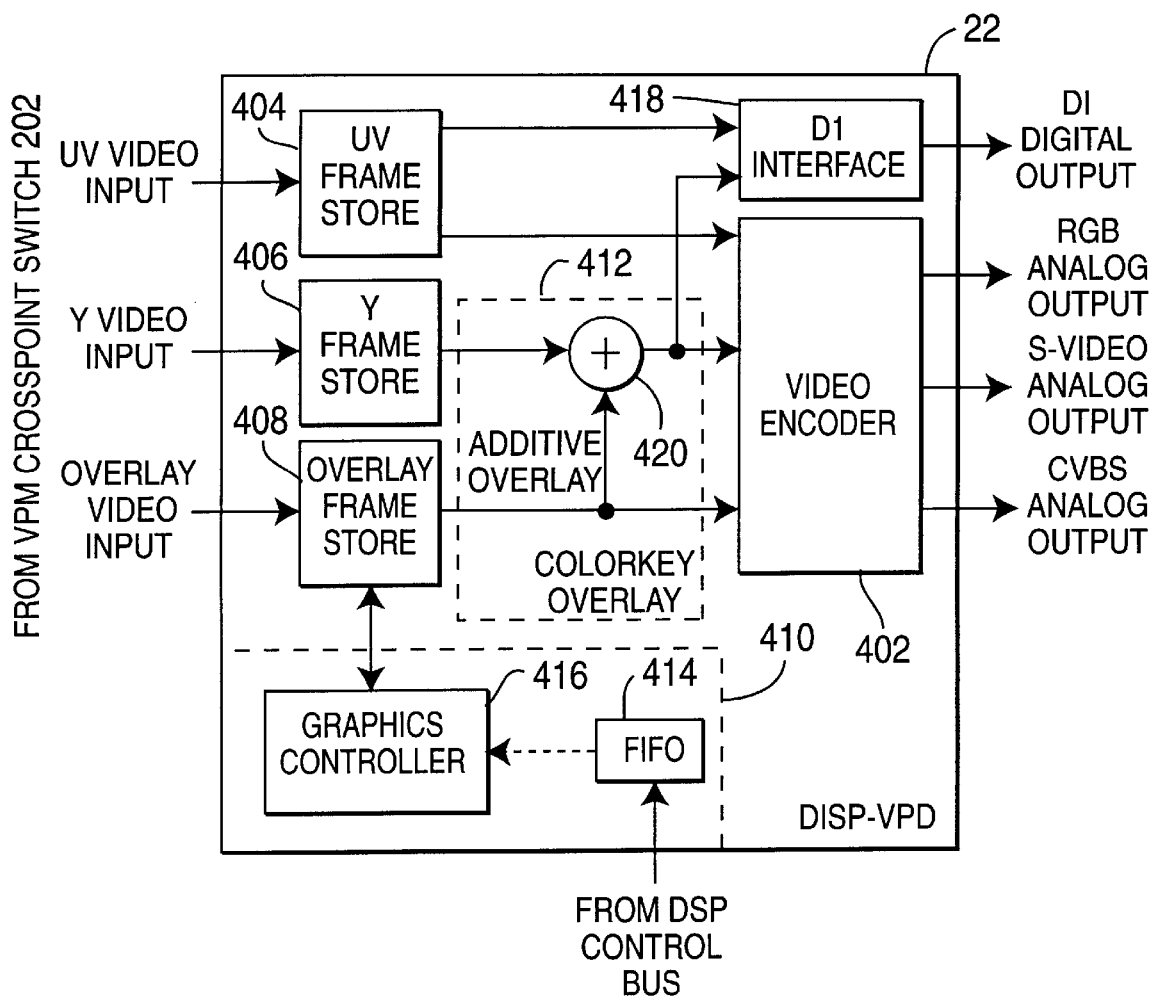
FIG. 4 is a block diagram of a Display Video Processor Daughterboard (VPD).

FIG. 4 illustrates the display VPD 22 shown in block form in FIG. 1. Display VPD 22 is based on a commercial video encoder (Philips SAA7182) 402, which converts a component digital video signal into a standard composite video signal (CVSB), component video signal (S-Video), and RGB. Since frame stores on the VPM 20 are typically in high demand in application programs, the display VPD 22 has three frame stores 404–408 included. Frame stores 404 and 406 are used to buffer the UV (Chroma) image and the component digital video signal Y (Luminance) image, respectively. According to standard 4:2:2 sampling definitions, the UV frame store 404 contains two color images U and V, which are stored in a horizontal interleaved manner. Frame store 408 provides for graphics overlay of information on the video display. Preferably, frame stores 404–408 are all 1k×1.5k×8 bits in size. Accordingly, frame stores 404–408 are large enough to provide double buffering of the display images. With double buffering, new image data can be loaded into the one part of the frame stores, while the other part is read out to the display. If image latency to the display is a concern, then the transfer of image data to the display buffer can be timed along with the time that the image data is read out from the same buffer region, without display image artifacts.

Two field programmable gate arrays (FPGAs) are provided on the display VPD 22. The first one is the VPD controller 410, and the second one is the video controller 412. The VPD controller 410 provides a control interface to the VPM 20 by providing access to the microprocessor control bus via FIFO 414 and also includes a graphics controller 416 for simple graphics functions, such as image clear, line drawings, and character generation. Having these functions on the display VPD 22 itself provides a significant reduction in data bandwidth on the GCB 40. Video controller 412, on the other hand, is in-between the output of the three frame stores 404–408 and the video encoder 402 to control graphics transformation tables. It also provides for the control of the parallel D1 output interface 418 or any other digital output interface and includes a summer 420 for adding the overlay image from frame store 408 to the luminance image as appropriate.

Figure 5:
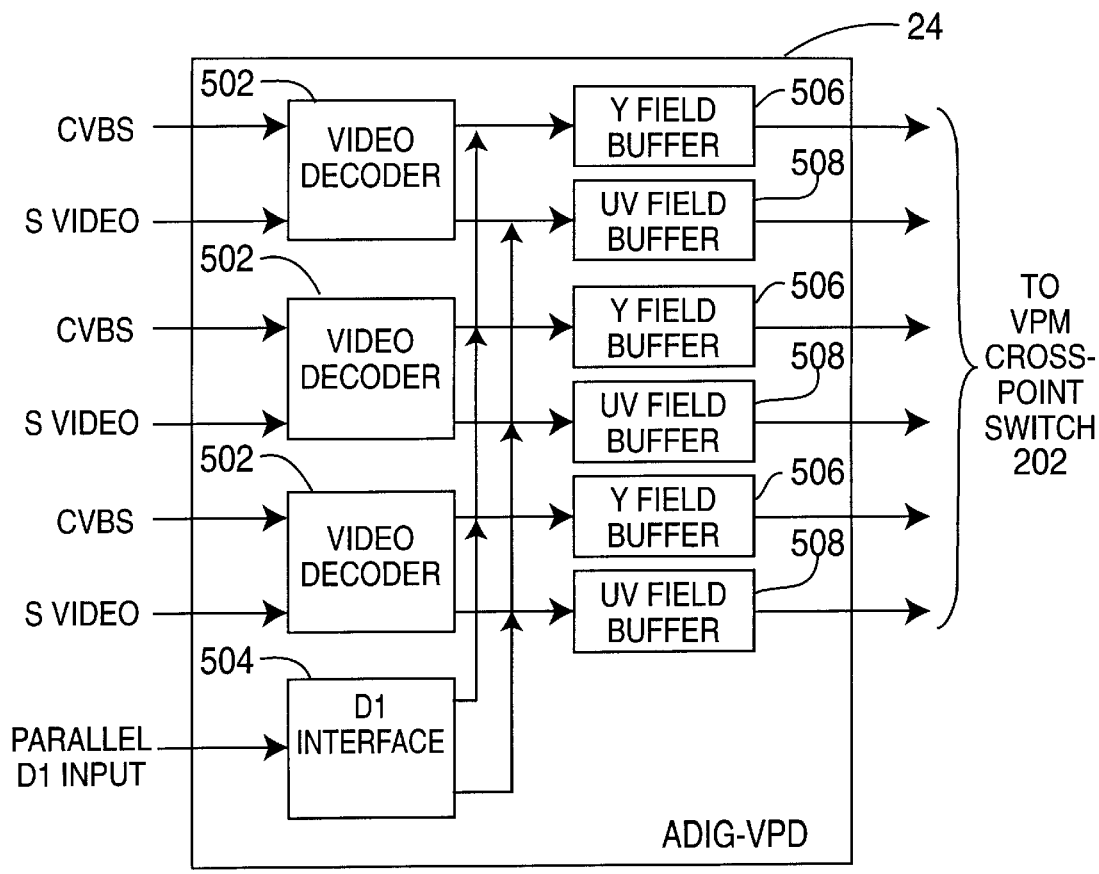
FIG. 5 is a block diagram of a Digitizer Video Processor Daughterboard (VPD).

FIG. 5 illustrates the digitizer VPD 24 shown in block form in FIG. 1. Digitizer VPD 24 is based on the Philips chip SAA7111A Video Decoder 502, which provides for color decoding and digitization of composite (CVBS) and component video (S-Video) data, both for NTSC and PAL. Three channels are preferably implemented on digitizer VPD 24 to support three asynchronous color video channels. Digitizer VPD 24 also supports RGB input by digitizing each color component in a separate video decoder 502. A parallel D1 or other digital interface 504 is also included to handle parallel D1 or other digital inputs.

Video decoders 502 digitize data in 720×242 fields at 60 Hz (NTSC), or 720×288 fields at 50 Hz (PAL). Two digital channels are sent to the output, one for luminance only (Y) and one for interleaved U and V color components. This provides data in the 4:2:2 format as defined by SMPTE 125M and similar standards. Each video decoder 502 is followed by two field buffers, Y field buffer 506 for the luminance channel and UV field buffer 508 for the color (U,V) channel. Buffers 506 and 508 provide optimized processing for the VPM 20 by buffering the 13.5 MHz data from the video decoders 502, followed by reading a full field at the VPM system clock (33 MHz) into the VPM frame stores and/or other processing elements.

In addition, a programmable interrupt is preferably provided that indicates to the system controller when data can be read from the field buffers 506 and 508 at the VPM clock speed without "overtaking" the video writing of the field data at 13.5 MHz. This provides maximum throughput of the data and processing functions on the VPM 20 while minimizing latency of video data from the digitizer VPD 24.

Figure 6:
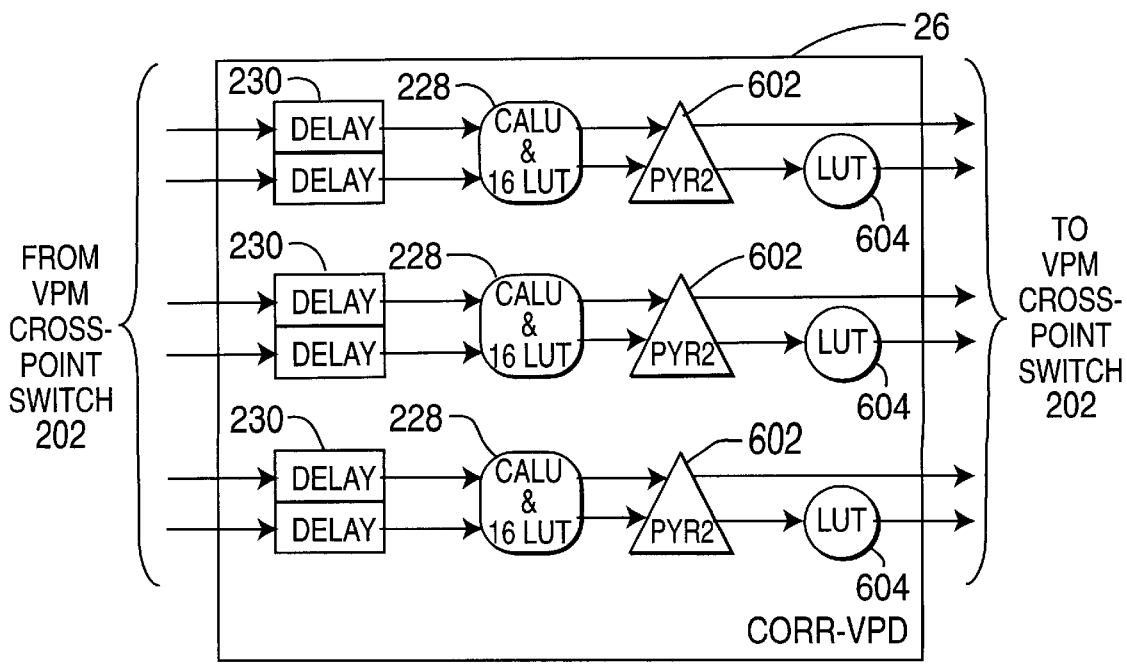
FIG. 6 is a block diagram of a Correlator Video Processor Daughterboard (VPD).

FIG. 6 illustrates the correlator VPD 26 shown in block form in FIG. 1. Correlator VPD 26 is designed for fast motion estimation, stabilization, and image fusion. It contains three CALUs 228 with FIFOs 230 and SRAM, identical to the CALU 228 with FIFOs 230 and SRAM on the VPM 20. In addition, the outputs of CALUs 228 are each followed by a PYR-2 pyramid processing ASIC 602 and a LUT 604, similar to the PYR-2 and LUT combination (e.g., 212, 220) on VPM 20. Many applications for motion estimation and fusion require a filter operation following a correlation or other computation performed in the CALU 228. The PYR-2 ASIC 602 can also be set to pass-through the two video data channels.

Figure 7:
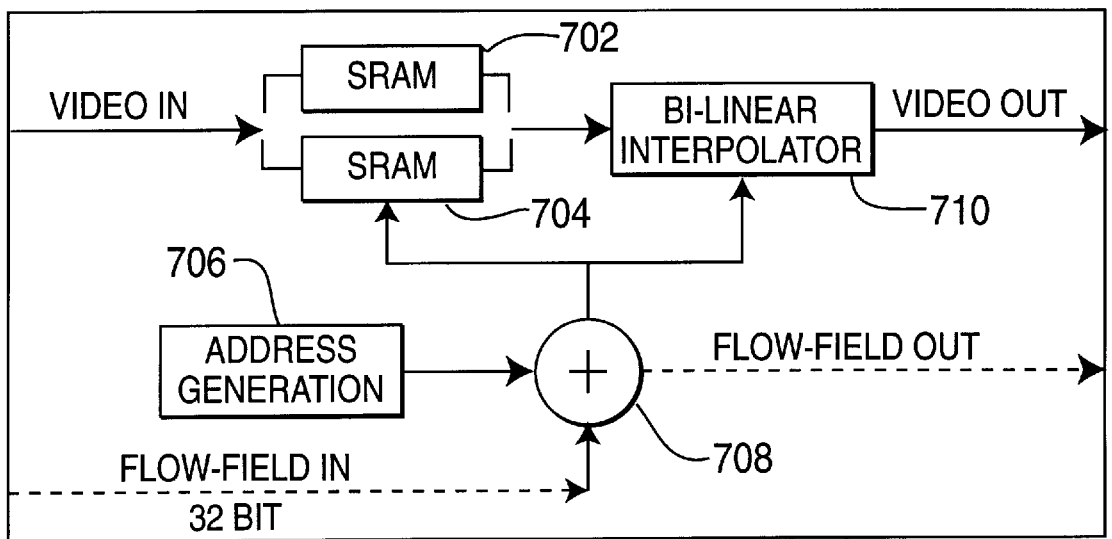
FIG. 7 is a block diagram of a Warper Video Processor Daughterboard (VPD).

FIG. 7 illustrates the warper VPD 28 shown in block form in FIG. 1. Warper VPD 28 is designed for real-time parametric image warping and includes two SRAM banks 702, 704 for simultaneous image acquisitions and warping. The warper VPD 28 also performs an address generation for parametric image transforms using address generator 706. In a preferred embodiment, the transforms are affine (six parameter) transforms, and address generator 706 is implemented as two FPGAs (Altera EPF1OK70). These FPGAs are large enough to be able to support the implementation of bi-cubic transforms or projective transforms (a division of two affines). An optional 32-bit flow field input (16 bits for X and 16 bits for Y) can be added to the parametric transformation by adder 708 by receiving four video data streams for the VPM 20 (i.e., from four frame stores). The generated flow field can also be sent to the VPM 20 as four video data streams. Preferably, warper VPD 28 includes a bi-linear interpolator 710 which is accurate to 1/32 pixel resolution.

Figure 8:
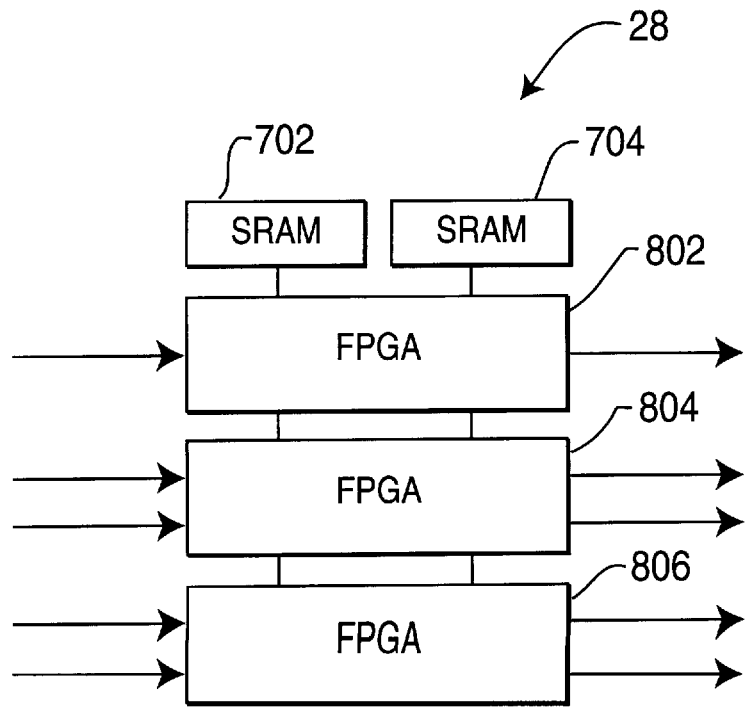
FIG. 8 is a preferred embodiment of the Warper VPD including five video inputs and outputs.

As shown in FIG. 8, a presently preferred implementation of warper VPD 28 consists of two SRAM banks 702, 704 and three FPGAs 802–806, and a total of five video inputs and five video outputs, making it essentially a very powerful configurable function module, that in standard operation is programmed for image warping, but can be programmed for many other types of operations. FPGA 802 (preferably a EPF10K50 in a BGA356 package) includes all the interfaces to the two SRAM banks 702, 704 and one video input and one video output. For the warper function, FPGA 802 implements all the functional interfaces to the SRAM for writing images and reading images from SRAM. FPGA 802 can read and write four neighboring pixels every clock cycle. The reading of four neighbor pixels supports the bi-linear interpolation as part of the image warp operation. The writing of four pixels would also support upsampling of video data (as is required for high-quality image warping). It is also possible to configure one SRAM bank as a 32-bit "stationary" flow field, while using the other SRAM bank for the storage and retrieval of images for the warp function. In this case, the other two FPGAs 804, 806 would not be required and could be removed or used for other operations. FPGAs 804 and 806 are each preferably a EPF10K70 (in RQFP240 packages). For the warping function, one of these FPGAs 804. 806 is dedicated to implement the X-address generation, and the other the Y-address generation. For scaled down applications, both X and Y address generation can be implemented in one FPGA so that the other FPGA could be removed. For more highly demanding functions, all the FPGAs 802–806 can be replaced with bigger FPGAs from Altera (e.g., 10K100 in the same packages used) without designing a new warper VPD 28. For this, the warper VPD 28 also can be changed to 3.3V operation by changing jumper wires.

As with other FPGAs on VPM 20, all three FPGAs 802–806 on the warper VPD 28 can be configured from software through a JTAG channel.

Global Video Bus

GVB 30 is shown in FIG. 1, and its connections to the VPMs 20 and PM 10 are shown in FIGS. 2 and 3, respectively. GVB 30 provides a method of providing video between the crosspoint switches 202 on the VPMs 20, and also can provide video to PM 10 from one of the VPMs 20. The video format over GVB 30 is the same as the video formats used throughout the rest of the VPS.

In a preferred embodiment of the invention, the VPS contains two backplanes: one for CompactPCI™, which serves as the Global Control Bus (GCB 40), and the other for the GVB 30. The GVB 30 need not conform to any common bussing standard and can be provided as several different implementations. The simplest version of the GVB 30 is a point-to-point hard connection between boards, which is implemented as a routed printed circuit board (PCB) backplane. This GVB 30, known as the "passive" GVB, has a fixed topology of interconnections between boards, and only supports a predesigned number of VPMs 20. The routing of video from the VPMs 20 to the GVB 30 is performed through monitoring the crosspoint state machines 238 on each of the VPMs 20. During execution, the hardware control library of the PM 10 is able to monitor which of the output and input paths to and from the GVB 30 from the VPM 20 is currently being used. Thus, using the crosspoint state machine 238, on-demand dynamic routing of video signals between VPS boards can be accomplished. This is the most efficient method of video routing to the GVB 30, for other methods rely on software bookkeeping of the used and available GVB connections, which in turn relies on the manipulation and updating of a significant amount of global data that needs to be administrated among all of the microprocessors and tasks.

In a preferred embodiment, there are two versions of the passive GVB 30: one for two VPMs and one PM, and one for three VPMs and one PM. However, the usage of one passive backplane over the other is application-specific, and depends on the number of VPMs that is required to perform a given task. When more than three VPMs 20 are used within a single VPS, the passive backplane is no longer sufficient for most video applications. The amount of board-to-board video transferrals in the VPS is very much specific to the task to be performed, and it is not tractable to have different passive backplanes for each application. In lieu of multiple passive backplanes, an active backplane can be used to remediate the problems of board-to-board video routing.

The active GVB 30 uses a secondary crosspoint switch (in this case, a 56×56×10 bit crosspoint switch) that resides as a daughterboard mounted on the back of the backplane. This crosspoint switch, programmable through control registers that are bridged to the GCB 40, connects all of the video inputs and video outputs from all VPS boards using a single routing device. Through the use of the active GVB 30, all of the advantages of the crosspoint switching mechanism: fan-out, non-blocking operation, etc., can be used to great advantage. Since the topology is no longer fixed, the active backplane supports the widest possible variety of different applications and tasks. The only limit with the active GVB 30 is the number of video paths to and from each of the VPS boards to the GVB 30. In a preferred embodiment, GVB 30 can accommodate up to 56 channels of video at 33 Mbytes/sec per channel.

Global Control Bus

The final VPS component is the GCB 40. The purpose of GCB 40 is to provide a random-access data bus that enables the microprocessors (C40 DSPs) 12 on the PM 10 to access the control registers that are present on the VPMs 20 and on the active GVB 30, should one be present within the system. A key concern with GCB 40 is the time to perform a control register store or read operation. To keep the real-time control overhead of the VPS to a minimum, the accesses to the control registers by the PM's microprocessors 12 should be as fast as possible. Analysis of the number of control registers on PM 10 quickly shows that well-known but slow busses such as the VME bus do not provide sufficient performance to handle the real-time tasks at the rates that are required of the VPS. Because of these performance concerns, a CompactPCI™ bus was implemented as the GCB 40 of the invention. CompactPCI™ operates using a 33 MHz clock, and is capable of performing random access data transactions at the required speed of 250 nsec/store operation, which is a requirement for the VPS's performance. (Register read accesses are much less common during real-time control than write operations and are a less significant concern for overall system performance.)

Keeping in mind that there are several busses within the VPS, there is still a significant issue regarding the time it takes for a microprocessor to complete a store operation to a control register. All microprocessor accesses to control registers must be arbitrated over the PMCB 334, then sent over the CompactPCI™ GCB 40, then propagated to the control registers on the destination board through that board's local control bus, then actually stored in the destination register. To ameliorate this problem, post-writing has been implemented at numerous stages in the writing process, thus freeing up the microprocessors to perform long chains of successive register writes with a minimal impact of register store speeds.

It is to be understood that the apparatus and method of operation taught herein are illustrative of the invention. Modifications may readily be devised by those skilled in the art without departing from the spirit or scope of the invention. For example, many of the elements described as being implemented in hardware may, of course, be emulated in software using known techniques. Also, it will be appreciated by those skilled in the art that many device functions and control interfaces of the video processing system described herein may be implemented using field programmable gate arrays (FPGAs) which are automatically configured for the specific hardware functions from on board EPROMs after power-up of the system. Most of such FPGAs may also be connected to a JTAG chain so that each of the FPGAs can be reconfigured for different or modified hardware functions from software on the microprocessors 12 of the PM 10. All such modifications are intended to be included within the scope of the appended claims.

We claim:

1. A modular video processing system comprising:
   a processing module containing at least one general purpose microprocessor, which controls hardware and software operation of said video processing system using configuration data, and which processes video data;
   at least one video processing module which contains a plurality of parallel pipelined video hardware components, the video processing module being responsive to said configuration data to perform different video processing operations on the video data;
   a global video bus which establishes a direct connection between the processing module and said at least one video processing module to route the video data between said processing module and said at least one video processing module; and
   a global control bus which provides said configuration data to/from said processing module from/to said at least one video processing module, said global control bus being separate from said global video bus.

2. The system of claim 1, wherein the plurality of parallel pipelined video hardware components are configured to perform the different video processing operations asynchronously.

3. The system of claim 2, wherein said processing module comprises at least two microprocessors each of which has an associated random access memory which is not shared with any other microprocessor, said processing module further comprising a shared memory which is accessible by each microprocessor of said processor module through an arbitrated control bus which arbitrates requests for access to said shared memory from each microprocessor.

4. The system of claim 3, wherein said processing module includes means for using the configuration data to program the at least one video processing module to perform at least one of the different video processing operations on the video data and means for providing a synchronous start signal to begin the at least one video processing operation.

5. The system of claim 3, wherein said processing module further comprises a communications interface for communicating with external devices, said communications interface being coupled to said arbitrated control bus for access by each of said at least two microprocessors.

6. The system of claim 3, wherein said random access memory associated with each microprocessor is connected to said global video bus to store video data for transmission to, and video data received from said global video bus.

7. The system of claim 3, wherein said processor module further comprises a semaphore register coupled to said arbitrated control bus, said semaphore register storing semaphores so as to facilitate coordination of mutually exclusive operations by said at least two microprocessors.

8. The system of claim 2, further comprising a hardware control library loaded on a general purpose microprocessor of said processing module, said hardware control library comprising a set of functions for programming the plurality of parallel pipelined video hardware components of said at least one video processing module to perform respective ones of said different video processing operations concurrently.

9. The system of claim 8, wherein said processing module comprises at least two general purpose microprocessors and said hardware control library further comprises a set of functions for coordinating concurrent multitask processing operations of said at least two general purpose microprocessors.

10. The system of claim 8, wherein said configuration data comprises respective control signals for each hardware component of said video processing system, wherein said functions of said hardware control library manipulate said control signals to program said hardware components for each of said different video processing operations.

11. A modular video processing system comprising:

a processing module containing at least one general purpose microprocessor, which controls hardware and software operation of said video processing system using configuration data, and which processes video data;

at least one video processing module which contains a plurality of parallel pipelined video hardware components, the video processing module being responsive to said configuration data to perform different video processing operations on the video data;

a global video bus which establishes a direct connection between the processing module and said at least one video processing module to route the video data between said processing module and said at least one video processing module; and a global control bus which provides said configuration data to/from said processing module from/to said at least one video processing module, said global control bus being separate from said global video bus;

wherein said video data is coupled with associated video timing signals synchronized to a system clock signal, and each video processing module comprises a crosspoint switch coupled to the global video bus, the cross point switch routing said video data and its associated video timing signals to/from respective ones of the plurality of parallel pipelined video hardware components, said timing signals indicating when the video data represents active video information.

12. The system of claim 11, wherein each video processing module further comprises a crosspoint switch state machine which monitors transfers of video data over each data path of said crosspoint switch and facilitates allocating paths for transferring the video data among the parallel pipelined video hardware components.

13. The system of claim 11, wherein the plurality of parallel pipelined video hardware components comprises a configurable arithmetic logic unit (CALU) responsive to said video data and its associated video timing signals so as to automatically compensate for differences in input video timing between respective images and to provide image accumulations and pointwise video processing operations on a pair of input images.

14. The system of claim 11, wherein the plurality of parallel pipelined video hardware components includes at least one pyramid filtering processor which generates spatially filtered representations of the video data at respectively different resolutions so as to facilitate real-time processing of said video data.

15. The system of claim 11, wherein the modular video processing system includes a plurality of video processing modules and each video processing module comprises a connection for at least one daughterboard the connection including means for routing at least a portion of the configuration data between the processing module and the daughterboard and means for coupling the daughterboard to the crosspoint switch.

16. The system of claim 15, further including a daughterboard comprising a display processor card coupled to the daughterboard connection of one of the plurality of video processing modules, the display processor card including video input ports connected to said crosspoint switch and an encoder which converts video data received at at least one of the input ports into a video signal of a predetermined format for display.

17. The system of claim 15, further including a daughterboard comprising a digitizer card coupled to the daughterboard connection of one of the plurality of video processing modules, the digitizer card including video output ports connected to said crosspoint switch and a decoder which decodes and digitizes video data received at at least one input port into a video signal of a predetermined format and provides the digitized video data to at least one of the output ports.

18. The system of claim 15, further including a daughterboard comprising a correlator card coupled to the daughterboard connection of one of the plurality of video processing modules, the correlator card including a plurality of video input and output ports connected to said crosspoint switch and a plurality of video processing channels, each channel comprising a configurable arithmetic logic unit, a pyramid filtering processor, and a look up table.

19. The system of claim 17, further including a daughterboard comprising a warper card coupled to the daughterboard connection of one of the plurality of video processing modules, the warper card including video input and output ports connected to said crosspoint switch, a pair of memory banks, an address generator, for controlling memory read operations and memory write operations in the memory banks, and a bilinear interpolator.

20. The system of claim 19, wherein said address generator and said bilinear interpolator are implemented as at least one field programmable gate array.

21. A method of creating a modular video processing system, comprising the steps of:

providing video data via a global video bus;

providing a global control bus separate from the global video bus;

connecting a processing module containing at least one general purpose microprocessor to said global video bus and said global control bus said microprocessor controlling hardware and software operations of said video processing system using configuration data and processing said video data;

connecting said global control bus and said global video bus to at least one video processing module which contains parallel pipelined video hardware that is responsive to said configuration data to provide respectively different video processing operations on the video data, the video processing module being configured to perform the different video processing operations concurrently;

said processing module detecting each video processing module connected to said global control bus; and passing said configuration data directly to each detected video processing module over said global control bus to program said parallel pipelined video hardware to perform at least one of said video processing operations; and associating video timing signals synchronized to a system clock signal with the video data, wherein each video processing module routes the video data and associated timing signals from any one of the multiple concurrent video processing operations to any one or more of the multiple concurrent video processing operations said timing signals indicating when the video data represents active video information.

22. The method of claim 21, comprising the additional step of providing at least one synchronous start signal via said global control bus said synchronous start signal being coupled to the processing module and to the at least one video processing module to signal the start of the at least one video processing operation.

23. The method of claim 22, comprising the additional step of coupling a semaphore register to the processing module said semaphore register being configured to coordinate multitask processing operations when said processing module comprises at least two general purpose microprocessors.

24. The method of claim 22, comprising the steps of configuring the video processing module to automatically compensate for differences in input video timing between two respective input images, including respective combinations of video data and video timing signals provided by said crosspoint switch and to provide pointwise video processing operations using the two input images and image accumulations of said respective images.

25. The method of claim 21, comprising the additional steps of connecting a crosspoint state machine to said crosspoint switch, said crosspoint state machine monitoring transfers of video data over each data path of said crosspoint switch and allocating paths for transferring the video data among the parallel pipelined video hardware components.

26. The method of claim 21, wherein said configuration data comprises respective control signals for each hardware component of said video processing system, the method including the step of coupling said processing module to manipulate said control signals to program said hardware components for each of said different video processing operations.

27. A modular processing system comprising:

at least one specialized processing module which contains a plurality of parallel pipelined hardware components that are programmable to provide respectively different, asynchronous specialized processing operations on an input stream of data;

a general processing module containing a general purpose microprocessor which controls hardware and software operation of said specialized processing module and said general processing module, using a hardware control library loaded on said general purpose microprocessor, said hardware control library comprising a set of functions for programming said parallel pipelined hardware of said at least one specialized processing module and said microprocessor of said general processing module to perform predetermined specialized processing operations on the input stream of data; and a global control bus which provides control data to/from said hardware control library of said general processing module from/to said at least one specialized processing module separate from said stream of input data to be processed by said general processing module and said at least one specialized processing module.

28. The system of claim 27, wherein said stream of input data is coupled with an associated timing signal synchronized to a system clock signal, and each specialized processing module comprises a crosspoint switch which routes said stream of input data and its associated timing signal among the parallel pipelined hardware components, said timing signal indicating when the input data represents active information.

29. The system of claim 27, wherein said general processing module comprises at least two general purpose microprocessors and said hardware control library further comprises a set of functions for coordinating concurrent multitask processing operations of said at least two general purpose microprocessors.

30. The system of claim 27, wherein said hardware control library includes control signals for each hardware component of said specialized processing system, wherein said functions of said hardware control library manipulate said control signals to program said hardware components for each of said different specialized processing operations.

* * * * *